United States Patent [19]

Kamm

[11] Patent Number: 4,945,269

[45] Date of Patent: Jul. 31, 1990

[54] RECIPROCATING ELECTROMAGNETIC ACTUATOR

[75] Inventor: Lawrence J. Kamm, San Diego, Calif.

[73] Assignee: Science Applications International Corporation, San Diego, Calif.

[21] Appl. No.: 303,531

[22] Filed: Jan. 26, 1989

[51] Int. Cl.⁵ .......................................... H02K 33/12
[52] U.S. Cl. ........................................ 310/15; 310/12
[58] Field of Search ...................... 310/12, 13, 14, 15, 310/27

[56] References Cited

U.S. PATENT DOCUMENTS 4,692,999 9/1987 Frandsen ................................ 310/13

Primary Examiner—Peter S. Wong
Assistant Examiner—Judson H. Jones
Attorney, Agent, or Firm—Fitch, Even, Tabin & Flannery

[57] ABSTRACT

A reciprocating electromagnetic actuator (20) includes a movable reciprocator (36) within a stationary stator (22). A permanent magnet (46) forms part of the reciprocator. A compensation coil (64, 66) forms part of and is embedded within the stator. A drive coil (72, 74) forms part of and is embedded within the reciprocator. The drive coil is selectively energized with an drive current (ID) from a current source (100). The compensation coil is selectively energized with a compensation current (IC) from another energy source (102). The current applied to the compensation coil is of opposite polarity from the current applied to the drive coil, and the ampere-turns resulting from the current ID applied to the drive coil must be equal to the ampere-turns resulting from the current IC applied to the compensation coil. The drive current ID interacts with the magnetic flux from the permanent magnet in order to move the reciprocator with a force that is proportional to the drive current at all locations along the stroke path of the reciprocator. In one embodiment (FIGS. 1-4), the reciprocator is mounted for linear reciprocating motion within the stator. In another embodiment (FIG. 19), the reciprocator is mounted for rotational reciprocating motion. Other embodiments (FIGS. 6, 9-12, 14) place the permanent magnet at different locations and/or orientations within the reciprocator or the stator.

37 Claims, 11 Drawing Sheets

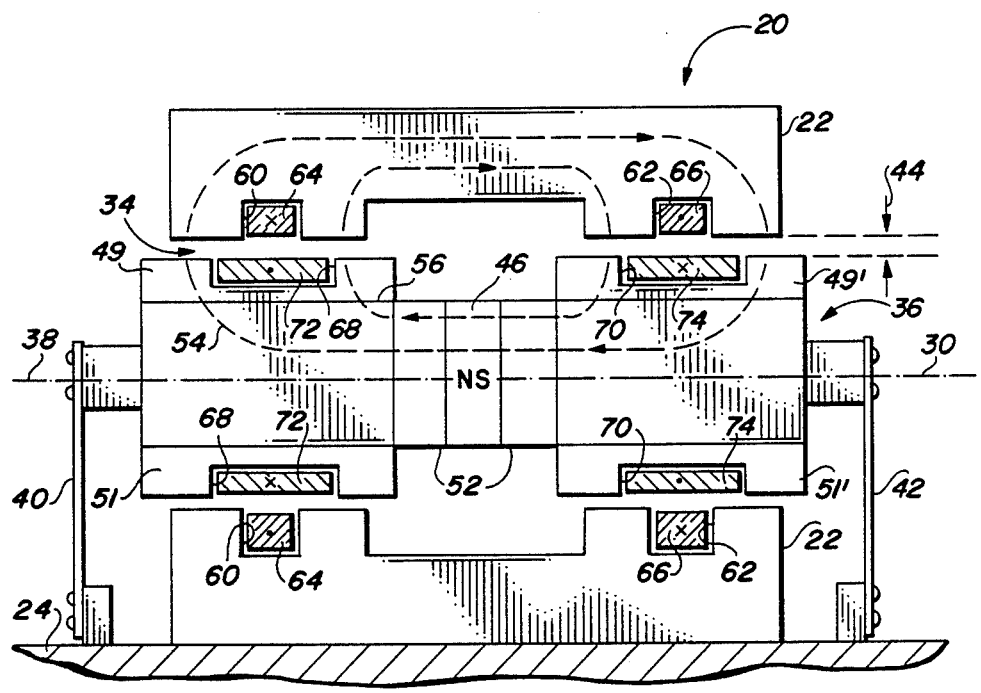

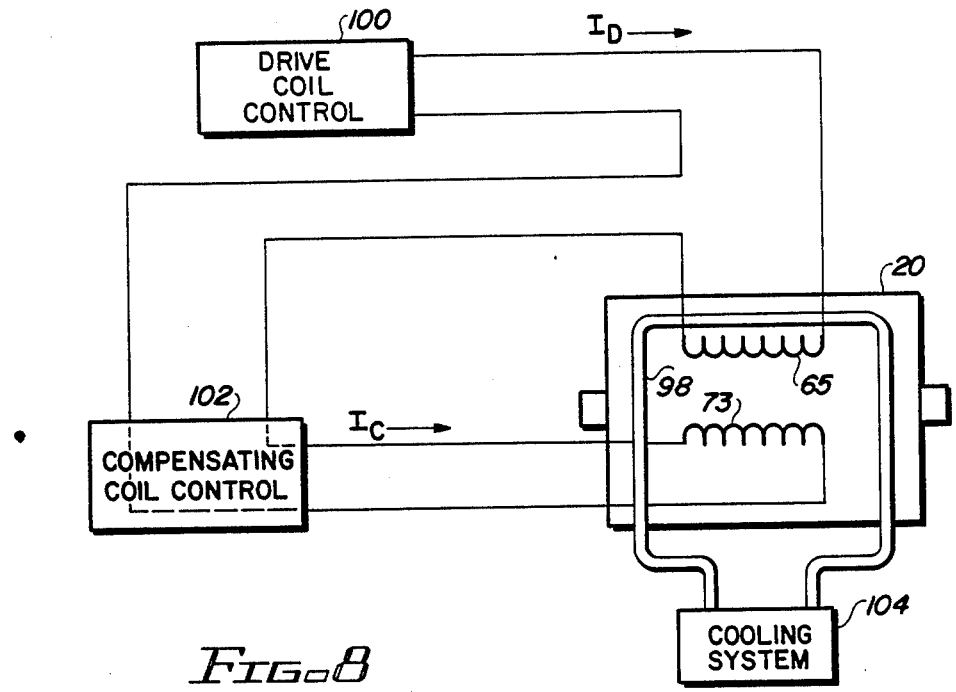
*Fig-8*
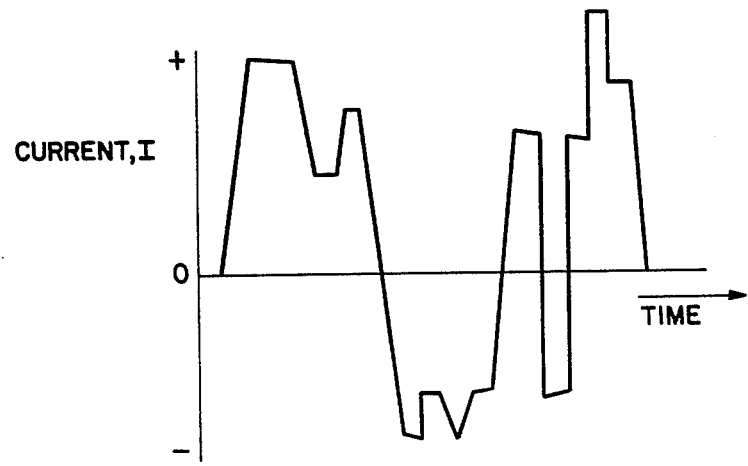
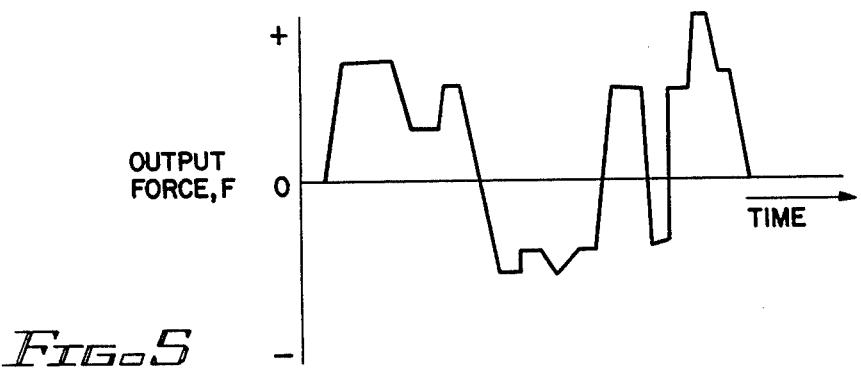
*Fig-9*

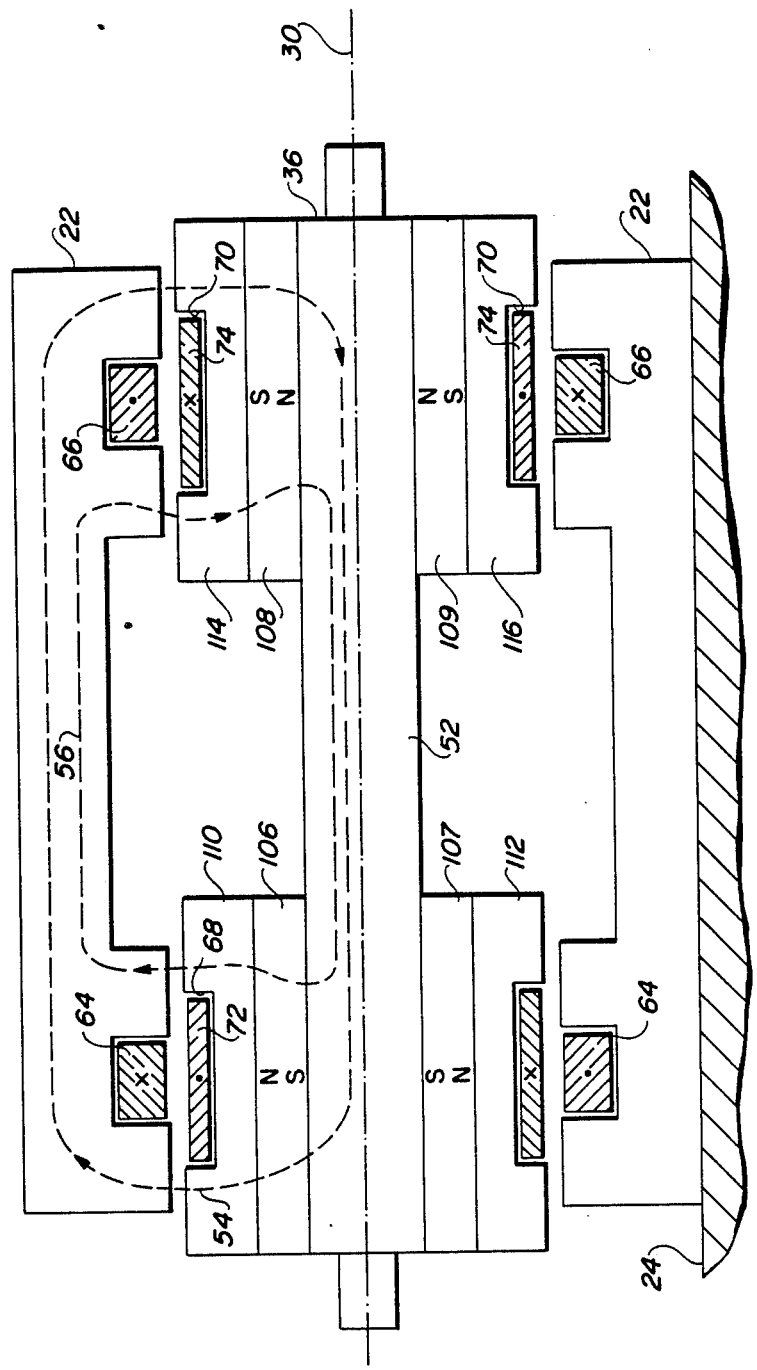

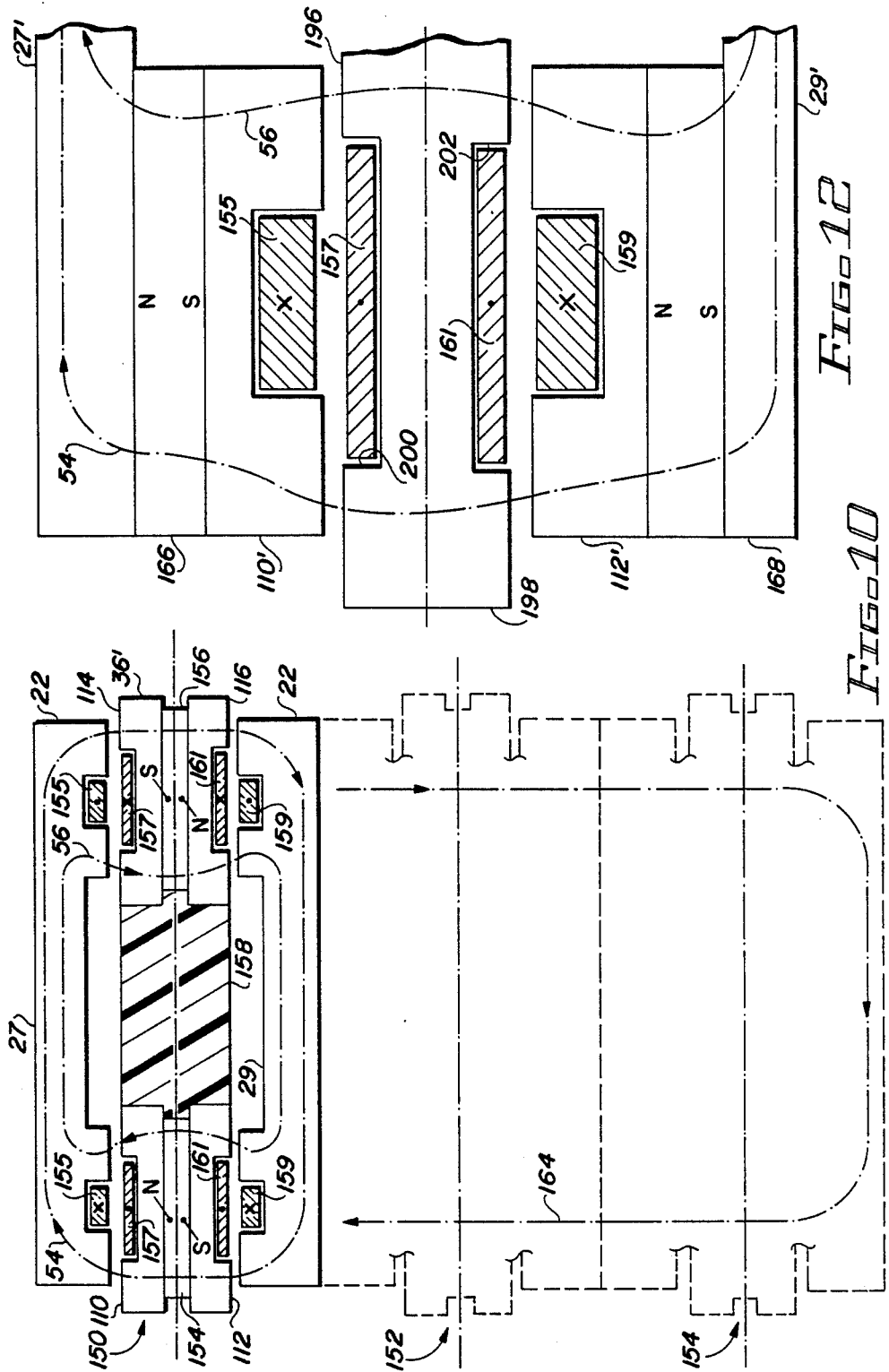

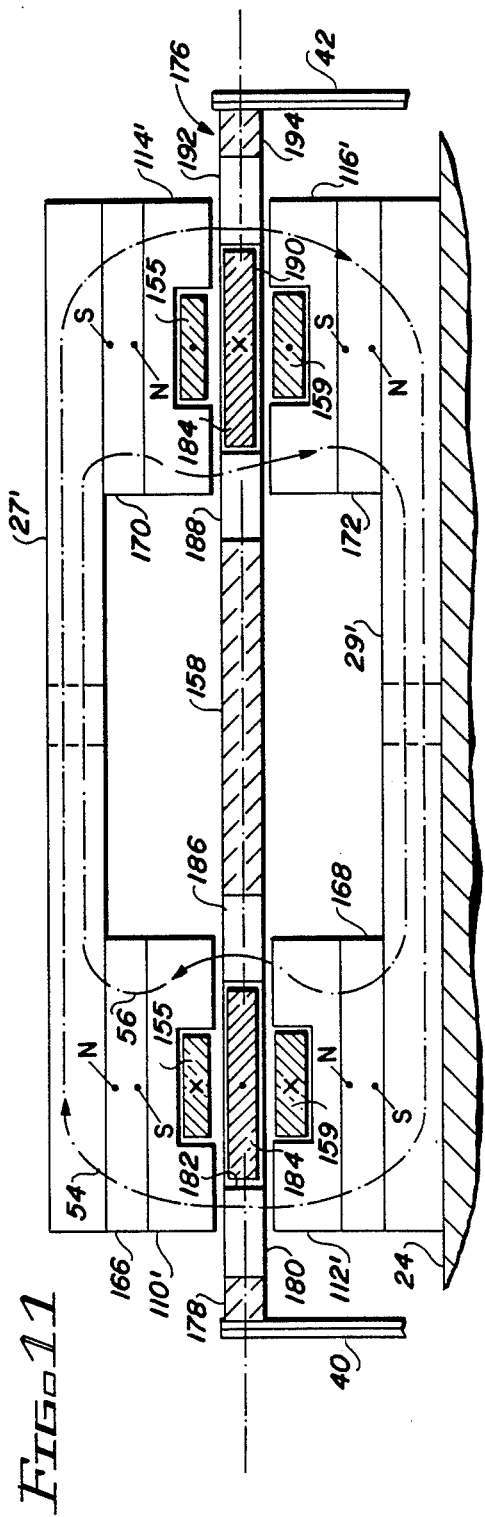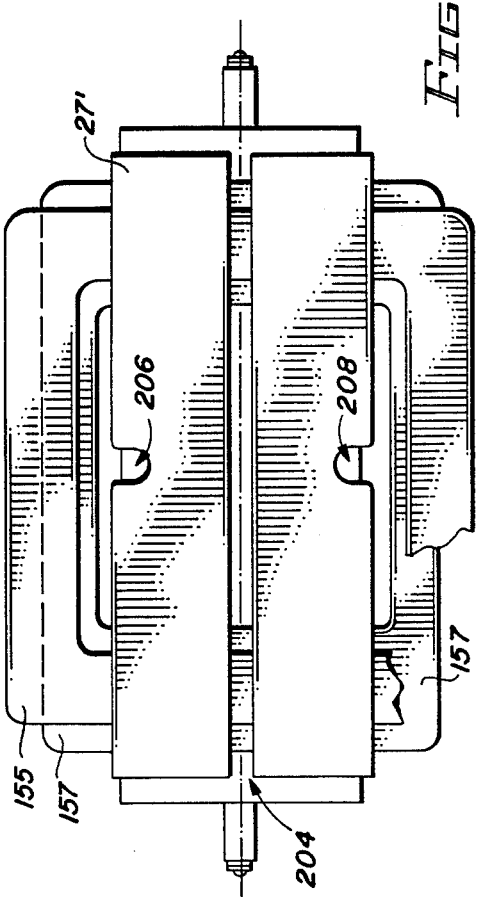

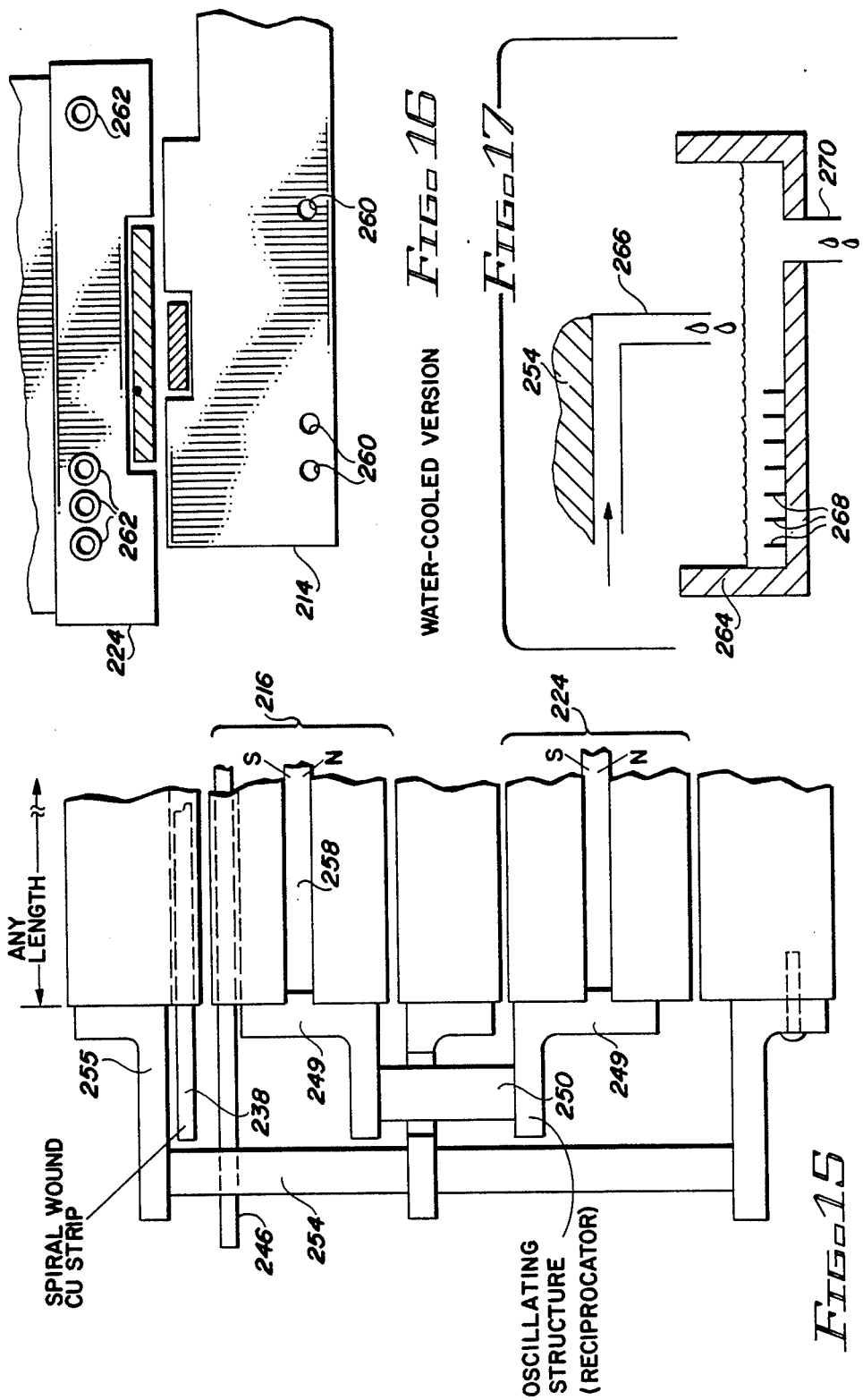

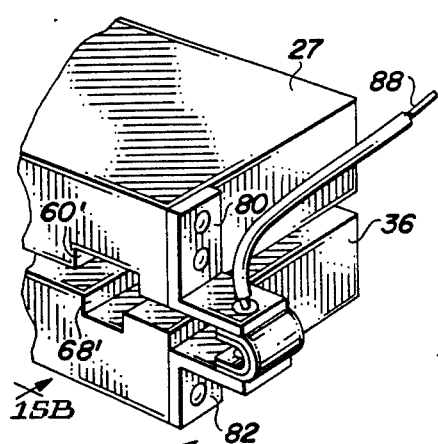
FIG.18A
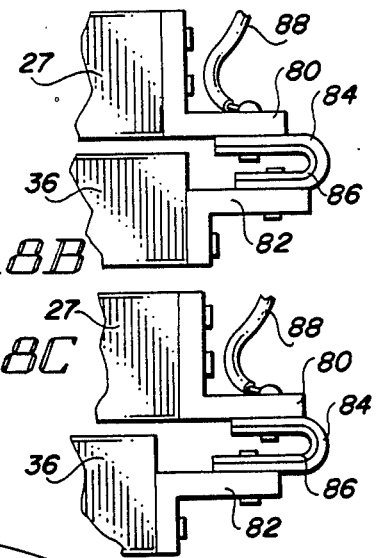
FIG.18B
FIG.18C
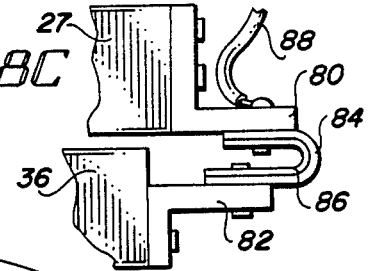
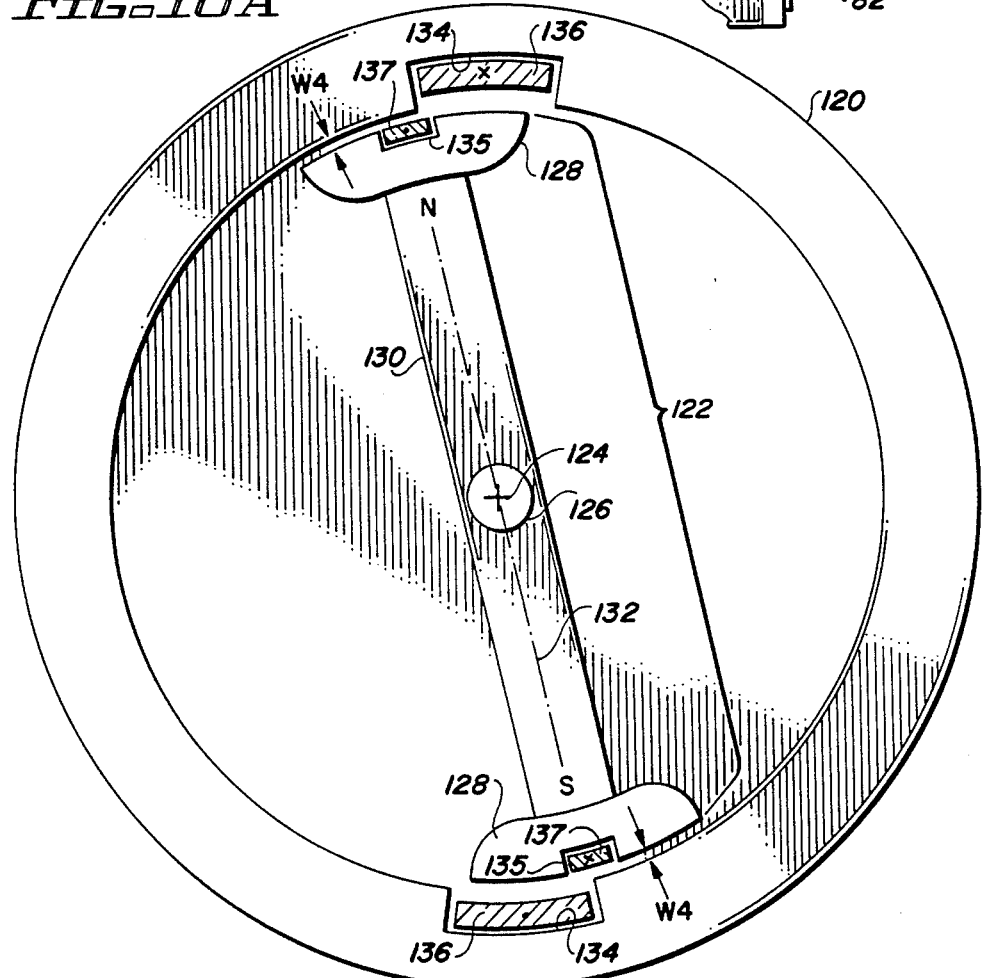
FIG.19

RECIPROCATING ELECTROMAGNETIC ACTUATOR

BACKGROUND OF THE INVENTION

The present invention relates to reciprocating electromagnetic actuators. More particularly, the present invention relates to a reciprocating electromagnetic actuator that produces instantaneous output forces over the full stroke or arc of the reciprocating device that are linearly proportional to an applied input current.

Electromagnetic actuator devices are known in the art that produce reciprocating motion. Such reciprocating motion may be either linear, i.e., back and forth along a straight-line axis; or angular, i.e., back and forth along a curved or arched axis. (It is noted that the term "linear" as used herein may have two separate meanings. When used to describe motion, "linear" refers to motion along a straight-line axis. When used to describe forces, "linear" refers to a proportional relationship between the output force of the device and an applied input current. More particularly, if $F=kI$, where F is the output force, I is the input current, and k is a constant, the output force is said to be "linear".) However, most are characterized by very small stroke, low frequency response, or low efficiency (low output power relative to the input power and weight/size of the device).

One of the most commonly known devices for producing linear motion is the voice coil motor. The voice coil motor typically includes an electric coil in the form of a thin wall cylinder that fits into a co-axial annular air gap in a magnetic circuit. The magnetic circuit includes a magnet (usually a permanent magnet) for generating magnetic flux that passes across the annular air gap. The voice coil is guided to move axially at right angles to the magnetic flux in the annular air gap.

While the voice coil motor offers the advantage of a relatively high frequency response, it suffers from numerous drawbacks. For example, because the voice coil is trapped in still air between the sides of the air gap, the coil exhibits poor heat dissipation. Further, the air gap thickness must equal or exceed the thickness of the coil plus mechanical clearances on each side. Large air gaps require large magnets in order to maintain the same forces that could be generated using small air gaps and smaller magnets. Typically, the coil is made thin to minimize magnet size at the expense of making the coil resistance high and making electrical heating correspondingly high.

Also known in the art for producing angular reciprocating motion is the d'Arsonval galvanometer. This device forms the basis for most DC voltmeters and ammeters. It is essentially the rotary equivalent of the voice coil motor. As such, it has the same advantages and disadvantages.

Still another type of device known in the art for producing linear motion is that shown in U.S. Pat. No. 3,336,488, invented by Scott, and that shown in U.S. Pat. No. 3,366,809, also invented by Scott. The Scott devices teach the use of a magnetic circuit having a stator with at least two pole pieces and an armature adapted for movement relative to the stator. Each pole piece has at least one slot therein, thereby forming at least two teeth in each pole piece through which the magnetic flux can flow. In particular, Scott teaches the concept of carefully spacing the teeth in the pole piece relative to the length of the armature segments facing the pole piece so that flux in the magnetic circuit is alternately transferred from one tooth to the next as the armature moves. The advantages of the Scott devices are that a long stroke can theoretically be achieved by simply increasing the number of teeth. However, the disadvantages of the Scott devices are that: (1) the flux density across the air gap does not remain constant as the armature moves; (2) the forces developed are thus non-linear (not proportional to input current); and (3) this non-linearity has the effect of adding a centering force to the intended force, as described below.

To illustrate, in the Scott devices the applied current superimposes a local magnetic flux on the main magnetic flux (from the permanent magnet). When the moving core (armature) is centered, the local flux is a maximum; but as soon as the core displaces, the local flux decreases. This is because the total reluctance of the local flux circuit is the sum of the reluctance on each side of the slot. The reluctance on the side with diminishing overlap approaches infinity as the moving core edge approaches the slot edge. Thus, the total reluctance of the local flux circuit also approaches infinity as the moving core edge approaches the slot edge. Thus, the total reluctance of the local flux circuit also approaches infinity, causing the flux density across the gap to decrease to zero as the core edge approaches the slot edge. This action, in turn, creates a non-linear output force which has the effect of centering the moving core between the two teeth at each end of the slot. Further, if large currents are applied to the Scott devices in an attempt to generate large forces, the iron will saturate and demagnetize the magnets.

In general, therefore, the Scott devices are useful only for applications where a non-linear output force is acceptable for generating reciprocating motion at relatively low output forces, such as in electric cutting devices. The Scott devices are totally inadequate for applications requiring a linear output force independent of the position of the moving core (armature), particularly where such forces must be large forces.

Another type of linear motion reciprocator known in the art is taught in U.S. Pat. No. 4,349,757, invented by Bhate. The Bhate device incorporates a series of carefully spaced permanent magnets on the armature, having alternating radially oriented polarities. The magnets are adjacent to the air gap. While the Bhate device offers some advantages, a careful examination thereof shows that the flux density at each point in each magnet rises and falls as that point is adjacent to a tooth or slot of the pole piece. That portion of the magnet opposite the slot is useless. Further, the rise and fall of the flux density tends to demagnetize the magnet. What is needed therefore, is a permanent magnet reciprocating device wherein the magnetic flux density remains constant, thereby providing linear forces and avoiding undesirable demagnetization.

SUMMARY OF THE INVENTION

The present invention provides a reciprocating electromagnetic actuator that develops true linear output forces independent of the position of its moving member relative to its non-moving member. The moving member, hereafter generally referred to as the "reciprocator," is mounted for reciprocating motion relative to the non-moving member, hereafter generally referred to as the "stator." Pole pieces in both the reciprocator and stator are positioned so as to face each other (hereafter this facing relationship may be referred to as "fronting") with a small air gap therebetween. The pole pieces comprise part of a magnetic path through which magnetic flux from a suitable source, e.g., a permanent magnet, may pass through one pole piece, across the narrow air gap, to the other pole piece. A drive coil, embedded within the reciprocator is positioned such that a portion thereof carries a drive current at right angles to the magnetic flux in the pole pieces, thereby developing a force according to well known electromagnetic principles. This force moves the reciprocator relative to the stator. A compensating coil, embedded within the stator, carries a compensating current equal in magnitude to the drive current, but of opposite polarity. Forces developed by interaction of the compensating current with the magnetic flux create no movement because the stator is held stationary. However, magnetic flux generated by the drive current is advantageously offset by magnetic flux generated by the compensating current, thereby maintaining the total magnetic flux in the magnetic circuit at a constant level, as generated by the permanent magnet. Further, the pole pieces are configured to maintain the total cross-sectional area fronting the air gap constant regardless of the position of the reciprocator relative to the stator over the full stroke distance of the reciprocator within the stator. Thus, the magnetic circuit reluctance does not change as the reciprocator moves, and the magnetic flux density across the air gap remains constant regardless of reciprocator's position within its defined stroke. This constant magnetic flux density advantageously allows output forces to be generated that are linearly proportional to the applied drive current, regardless of the position of the reciprocator along its defined stroke, thereby resulting in a truly linear electromagnetic actuator.

Advantageously, heat generated in the drive or compensating coils can be efficiently dissipated. Further, the air gap is not limited by the thickness of the coil, thereby allowing larger forces to be efficiently generated. Moreover, unlike some prior art devices, such as the Bhate device, a large number of permanent magnets are not required, either on the moving portions of the motor or the stationary portions.

The reciprocating electromagnetic actuator of the present invention thus includes a reciprocator formed of a ferromagnetic material, a stator also formed of a ferromagnetic material, the reciprocator being mounted for reciprocal motion relative to the stator, means for generating a magnetic flux that passes through the stator and reciprocator, a first coil disposed in the stator through which a first current is passed, and a second coil disposed in the reciprocator through which a second current is passed. In a linear motion embodiment, the reciprocator and stator are mounted such that their respective longitudinal axes are parallel to each other, concentrically, so as to allow relative linear motion between the two components. In an angular motion embodiment, the reciprocator and stator are mounted such that their respective axes of rotation are concentric, so as to allow relative angular motion between the two components. In either embodiment the stator has a first pole piece in which a first slot of a first width is placed. The first coil passes through this first slot. In turn, the reciprocator has a second pole piece in which a second slot is placed, the second slot generally facing or fronting the first slot. The second slot has a second width different than the first width. The second coil passes through the second slot. The magnetic flux passes through the reciprocator and stator following a flux path that bypasses the first and second slots on at least one side of the slots, the magnetic flux thereby linking or not linking the first and second coils as a function of whether the magnetic flux bypasses the slots on one side or the other. The invention further includes means for exciting the first coil with a first current and for exciting the second coil with a second current of equal ampere turns. The effect of the second coil is to reduce the self-inductance of the first coil to zero, thereby preventing the first current from creating magnetic flux that would add to or subtract from the magnetic flux already present in the flux path, which adding or subtracting of magnetic flux would undesirably affect the linearity of the actuator. Because the second coil effectively compensates for (reduces) the self-inductance of the first coil, the second coil is sometimes referred to as a "compensating" coil, and the first coil is referred to as a "drive" coil.

Advantageously, a feature of the present invention is that the means for generating the magnetic flux can be a one or more permanent magnets mounted within the reciprocator, the stator, or both. In one embodiment, the polar axis of such magnet(s) can be skewed relative to the longitudinal axes of the stator or reciprocator in order to maintain a desired flux density while reducing the overall physical dimensions of the core piece or pole piece components.

Still another feature of the invention allows a plurality of reciprocating electromagnetic actuators as above described to be stacked one on top of the other (or one next to the other), thereby effectively placing such actuators in parallel. The reciprocator of each stacked actuator can then be physically coupled to the other reciprocators of the other actuators in order to increase the force delivered.

As indicated above, it is a main feature of the present invention to provide an electromagnetic actuator that develops an output force at its moving member (reciprocator) that is linearly proportional to an applied drive current independent of the position of the moving member along its defined stroke length or arc.

It is another feature of the invention to provide an electromagnetic actuator having a reciprocator and stator with an air gap therebetween, and wherein the magnetic flux density across the air gap remains constant regardless of the position of the reciprocator relative to the stator.

A further feature of the invention advantageously allows magnets and currents of almost any size to be used in the construction of the reciprocating actuator, thereby making the actuator design adaptable to a wide variety of applications. Hence, for example, very large reciprocating forces can be efficiently developed through the use of relatively large magnets and currents, limited primarily only be heating. Further, if needed, the construction disclosed herein readily lends itself to the inclusion of cooling systems within the actuator in order to dissipate heat.

It is further noted that while the preferred embodiments of the invention described herein contemplate that the stator be held stationary and that the reciprocator be allowed to move, either component can be mounted for reciprocating movement relative to the other.

It is further noted that while the embodiments described herein relate generally to linear motion reciprocating electromagnetic actuators, rotary equivalents of such linear actuators also exist and could be readily fashioned by those skilled in the art from the descriptions presented herein.

BRIEF DESCRIPTION OF THE DRAWINGS

The above and other advantages and features of the present invention will be more apparent from the following more particular description thereof presented in conjunction with the following drawings, wherein:

FIG. 1 is a diagrammatic illustration of a simplified embodiment of a reciprocating electromagnetic actuator made in accordance with the present invention;

FIG. 2 is an end view of the actuator of FIG. 1;

FIG. 5 shows the output force developed by the actuator of the present invention as a function of an input current having an irregular waveform;

FIG. 8 is a block diagram of the control and cooling systems used with the motor of the present invention;

FIG. 9 is a diagrammatic illustration of an alternative embodiment of the present invention;

FIG. 10 is a diagrammatic illustration of yet a further alternative embodiment of the invention, and illustrates how a plurality of such devices can be stacked together;

FIG. 11 is a diagrammatic illustration of still yet another embodiment of the motor of the present invention;

FIG. 12 is a partial diagrammatic illustration of a variation of the embodiment shown in FIG. 11;

FIG. 13B is a top view of the embodiment of FIG. 11 or FIG. 12, and further clarifies the orientation of the drive coil and compensation coil relative to the longitudinal axis of the motor;

FIG. 15 is a partial end view of the embodiment of FIG. 14;

FIG. 16 illustrates water cooling of the embodiment of FIG. 14;

FIG. 17 diagrammatically illustrates the use of fluid both for cooling and for making electrical contact with the moving drive coil on the reciprocator;

FIGS. 18A, 18B and 18C detail one embodiment of a flexure mechanism used to make continuous electrical contact with the moving compensation coil; and FIG. 19 is a simplified diagrammatic illustration of an angular embodiment of the present invention.

DETAILED DESCRIPTION OF THE INVENTION

Figure 3:
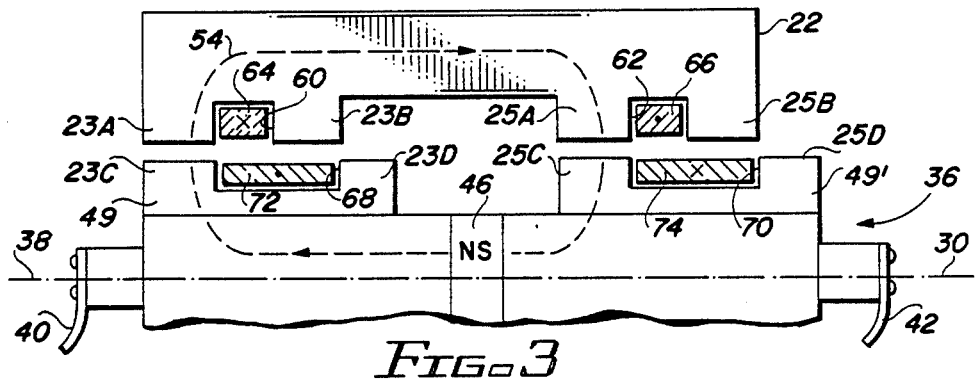
FIGS. 3 and 4 are partial diagrammatic illustrations similar to FIG. 1 showing the reciprocator in its respective furthermost left and right positions relative to the stator.

The following description is of the best presently contemplated mode of practicing the invention. This description is not to be taken in a limiting sense but is made merely for the purpose of describing the general principles of the invention. The scope of the invention should be ascertained with reference to the appended claims.

Before describing the specific details of the various embodiments of the invention, a brief description of the fundamental operating principles upon which the invention depends may be helpful. Essentially, it is fundamental that when a conductor carrying a current is placed in a magnetic field, a force is exerted on the conductor. When the conductor is at right angles to the magnetic field, the force is at right angles to both the conductor and the magnetic field. The force generated is directly proportional to the flux density of the magnetic field, the length of the conductor in the field and the amount of current in the conductor. Because all the forces in a magnetic system must be balanced, per Newton's Third Law, when a force is exerted on a conductor, an equal and opposite force is exerted on the other elements of the system. Similarly, when magnetic flux is carried by iron that surrounds, or otherwise bounds, a conductor carrying a current, such as a coil embedded in a slot between teeth in the iron, a force is generated that is directly proportional to the flux density in the iron, the length of the conductor (number of turns in the slot), and the amount of current in the conductor.

It is also fundamental that a current carrying conductor generates a magnetic field around the conductor. The flux of this magnetic field may add to or subtract from the flux of any other magnetic field that is present, depending upon its direction. Current carrying conductors placed in a magnetic field can thus be used to selectively add flux at some points, and subtract flux at other points, thereby giving the effect of diverting the flux from one position to another, depending upon the strength of the prior-existing field and the direction of the current flow.

Finally, it is noted that the amount of magnetic flux in a magnetic circuit is related to the magnetic properties (reluctance) of the type of material in which the flux is found, just as the amount of current present in an electrical circuit is related to the electrical properties (impedance) of the material (conductors) in which the current flows. In general, certain magnetic materials (such as iron) exhibit low magnetic reluctance and allow magnetic flux to pass therethrough with less effort or energy (magnetomotive force) than do non-magnetic materials (plastic, wood, air). For example, if a given amount of magnetic flux is present in a magnetic circuit as forced by a given amount of magnetomotive force, and if such flux is presented with two parallel paths, one of air, the other of iron, almost all of the flux will travel through the iron. Therefore, if a segment of magnetic material, such as iron, is placed within an air gap of a magnetic circuit, the vast majority of the flux crossing the air gap will seek out and pas through the iron. If the segment of iron in the air gap is mounted such that it can freely move, and if the location at which the flux crosses the gap is changed, the segment of iron is forced towards the position at which the total flux is a maximum. Hence, if a current carrying conductor is selectively positioned within the magnetic circuit so as to selectively divert the location at which the most flux crosses the air gap from one location to another (as by changing the direction of the current flow), a movable segment of iron within the air gap can be made to reciprocate back and forth in synchrony with the flux diversion.

With the above fundamental electromagnetic principles in mind, reference is now made to FIGS. 1 and 2 wherein a diagrammatic illustration of one embodiment of a reciprocating electromagnetic actuator 20 made in accordance with the present invention is shown. The actuator includes a stator 22 secured to a stationary reference plane 24. The stator, as shown best in FIG. 2, includes four identical separate stator sections 26, 27, 28, and 29, one on each side of the stator, all securely mounted to each other and the reference plane 24, and all spaced equidistant from a longitudinal axis 30. Typically, each stator section is made from steel laminations 32a, 32b, etc., each made from silicon steel or transformer iron. Each of these stator sections are identical in construction and operation; hence, the description that follows is generally limited to just one stator section, usually the upper stator section 27.

Each of the stator sections 26–29 surround and define a centrally located core 34. A reciprocator 36, having a longitudinal axis 38, is mounted for reciprocating motion within the core 34. Preferably, once the reciprocator is mounted within the stator, the longitudinal axis 30 of the stator and the longitudinal axis 38 of the reciprocator are the same. That is, the reciprocator and stator are coaxial. Any suitable mounting technique could be used to perform this reciprocal mounting function, such as linear bearings, sliding or rolling bearings, or hydrostatic bearings. However, as shown in FIGS. 1 and 2, the preferred mounting technique is to use a flexure 40 at one end of the actuator and a similar flexure 42 at the other end of the actuator. Each of these flexures has one end securely fastened to the reference plane 24 and the other end fastened to one end of the reciprocator 36. The reciprocator 36 is supported within the core 34 by the flexures 40, 42 so as to maintain a substantially constant-width air gap 44 between facing sides of the reciprocator and stator.

As shown in FIG. 1, the reciprocator 36 includes a center section 52, made from a suitable solid ferromagnetic material. A permanent magnet 46, having a magnetic polar axis (north-south pole alignment) that is aligned with the longitudinal axes 30 and 38 of the stator and reciprocator, is positioned within the center section 52. At the left end of the center section 52, and as part of the reciprocator 36, are pole pieces 48, 49, 50 and 51, each facing the respective stator sections 26, 27, 28 and 29. Similar pole pieces 48', 49', 50' and 51' are located at the right end of the center section 52. These pole pieces 48–51 and 48'–51' are preferably made from silicon steel or transformer iron laminations in a manner similar to the construction of the rotator sections 26–29. The reciprocator 36, with its magnet 46, center section 52, and pole pieces 48–51 and 48'–51', in combination with the stator 22, including the stator sections 26–29, thus comprise a magnetic circuit in which magnetic flux is found. Adopting the convention of magnetic flux passing from the north pole to the south pole, and with the orientation of the magnet polarity shown in FIG. 1 (north pole on the left), it is seen that at least one flux path travels clockwise from the north pole of the magnet 46, through the center section 52, through pole piece 49, across the air gap 44, longitudinally through the stator section 27, back across the air gap 44, through pole piece 49', through the center section 52, and back to the south pole of the magnet 46. Two flux paths 54 and 56 are identified in FIG. 1 by dotted lines. The manner in which flux follows these paths will be explained below in connection with the description of FIGS. 3 and 4. Other flux paths, not shown, carry the flux from other pole pieces to the other stator sections.

Still referring to FIG. 1, it is seen that a slot 60 is placed in the left end of the stator 22, and a slot 62 is placed in the right end of the stator 22. Corresponding slots 60 and 62 pass through each section 26–29 of the stator 22. A compensating coil 64 is placed in the slot 60, and another compensating coil 66 is placed in the slot 62. These coils pass through each slot of each stator section, as best seen in FIG. 2. In practice, as is understood by those versed in the art, the coils 64 and 66 are typically connected in series, thereby forming a single compensating coil.

Similarly, a slot 68 is placed in each of the pole pieces 49–51, and another slot 70 is placed in each of the pole pieces 49'–51'. A drive coil 72 is placed in slot 68 so as to pass through each pole piece 49–51, and another drive coil 74 is placed in slot 70 so as to pass through each pole piece 49'–51–. The coil 72 is connected in series with the coil 74, thereby forming a single drive coil. Further, as explained below, the drive coil 72, 74 and the compensating coils 64, 66 are also preferably connected in series, thereby ensuing that the same current flows through both the drive coil and the compensating coil.

A note about the convention used herein to illustrate the coils 66 and 74 (or 64 and 72) is in order. First, following conventional practice, the current flowing in these coils is drawn as a "+" or a "x" if the current is flowing into the paper away from the observer (symbolic of the tail of an arrow), and as a dot, ".", if the current is flowing out of the paper towards the observer (symbolic of the point of an arrow). Second, for simplicity, only one turn is illustrated for the coils in the diagrammatic type figures presented herein. However, it is to be understood that any number of turns could be (and generally is) employed. (As is known to those skilled in the art, and ignoring secondary effects, the same current density, and hence the same magnetomotive force for magnetic circuit analysis purposes, results from using a single-turn coil having a given cross-sectional area as is obtained using a multi-turn coil, all the turns of which combine to give the same cross-sectional area.)

To illustrate, it is seen in FIG. 1 that the coil 64 has a current therein that is going into the paper at the top portion of the coil and is coming out of the paper at the bottom portion of the coil. Thus, the drive coil lies in a plane that is substantially perpendicular to the plane of the paper of FIG. 1, and perpendicular to the axis 30. Similarly, the compensation coil 72 has a current that flows out of the paper at the top of the coil and into the paper at the bottom of the coil.

Figure 4:
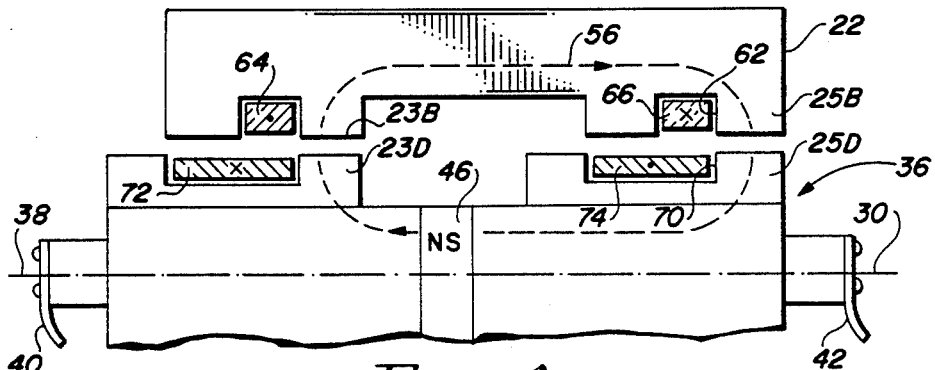

Referring next to FIGS. 3 and 4, the operation of the actuator shown in FIGS. 1 and 2 will be explained. In FIG. 3, a portion of the diagrammatic illustration of FIG. 1 is shown with the reciprocator 36 at its extreme right position relative to the stator 22. In FIG. 4, the reciprocator 36 is at its extreme left position. As seen in FIG. 3, with the reciprocator at its right position, all of the flux follows a flux path 54 that passes through coil 72, but not coil 74. This is because, with the reciprocator all the way to its right, as shown, only those portions of the reciprocator 36 and stator 22 to the left of the slots 60, 62 and 68, 70, are aligned to provide a flux path having a narrow air gap. This path thus represents the path of lowest reluctance, and all of the flux passes therethrough, except for leakage flux.

Similarly, with the reciprocator 36 moved to its left position, as shown in FIG. 4, all of the flux follows path 56 which passes through coil 74, but not coil 72. This is because, with the reciprocator all the way to its right, as shown, only those portions of the stator 22 and reciprocator 36 to the right of the slots 60, 62 and 68, 70, are aligned to provide a flux path having a narrow air gap.

Said another way, the slot 60 may be thought of as creating teeth 23A and 23B in one end of the stator 22. Similarly, the slot 62 may be thought of as creating teeth 25A and 25B in the other end of the stator 22. These teeth 23A, 23B and 25A, 25B may be thought of as pole pieces of the stator 22. Likewise, slot 68 creates teeth 23C and 23D in pole piece 49; and slot 70 creates teeth 25C and 25D in pole piece 49'. When the reciprocator is moved to its extreme right position, FIG. 3, only teeth 23A and 23C at one end of the actuator, and teeth 25A and 25C at the other end of the actuator, align in a way that provides a low reluctance magnetic path through which the flux can readily pass. When the reciprocator is moved to its extreme left position, FIG. 4, only teeth 23B and 23D at one end of the actuator, and teeth 25B and 25D at the other end of the actuator, align in a way that provides a low reluctance magnetic path through which the flux can readily pass. When the pole piece is intermediate between its extreme left and right positions, FIG. 1, a portion of all the teeth 23A–23D and 25A–25D align to provide two magnetic paths of low reluctance through which the flux can pass. Because the total overlap area of teeth 23A and 23B and teeth 23C and 23D is constant, and the total overlap area of teeth 25A, 25B and teeth 25C, 25D is also constant, the total amount of flux in the magnetic circuit remains substantially constant. Further, because the flux in magnet 46 is constant, there is no tendency to demagnetize the magnet 46. This is because at all points in the travel of the reciprocator 36, the magnet 46 is generating its maximum flux. Moreover, because this flux in center section 52 is constant, the center section 52 need not be laminated or of low loss material, thereby reducing the complexity and cost of the device. Thus, the center section 52 may be made from a suitable solid ferromagnetic material, such as iron.

In operation (and limiting the discussion to just one end of the actuator, although it is understood that corresponding events are occurring at the other end of the actuator), when the reciprocator 36 is in an intermediate position, such as is shown in FIG. 1, and prior to the application of any current to the coils 60 or 72, the magnetic flux generated by the magnet 46 splits between the two flux paths 54 and 56. As soon as a current is passed through coil 72, however, additional magnetic flux is generated around coil 72. In the absence of compensating coil 64, this additional flux would ten to add to the flux flowing in path 56 and subtract from the flux flowing in path 54, thereby changing the flux density at the air gap. However, when a compensating current is passed through coil 64 at the same time as a drive current is passed through coil 72, and when the magnitude of the compensating current is equal to the drive current, but of an opposite polarity, any additional flux generated around coil 72 by the drive current is offset by opposing flux generated around coil 64 by the compensating current. Hence, the flux density at the air gap remains constant. This is true regardless of the position of the reciprocator along its stroke path (the stroke path including the extreme right and left positions of the reciprocator in FIGS. 3 and 4, and all positions in between). Further, at all points along this stroke path, the drive current is flowing perpendicular to the magnetic flux. Hence, a force is generated, according to well known principles, that attempts to move the reciprocator along its stroke path in one direction or the other, depending upon the direction of the current. (Similarly, the compensating current is flowing perpendicular to the magnetic flux and a force is generated that attempts to move the stator in one direction or the other. However, because the stator is firmly anchored, no movement occurs due to the compensating current.)

Advantageously, because the flux density remains constant at al points along the stroke path, the amount of force at any point along the stroke path can be precisely controlled by simply altering the magnitude of the drive current. The force developed is proportional to the magnitude of the current. That is $F = kI$, where F is the force developed, I is the drive current passing through coil 72, and k is a constant. Hence, by simply applying a current of a desired magnitude, a proportional force is produced. Significantly, by altering the current according to any desired waveform, from DC (0 Hz) to high frequencies, a corresponding output force is developed at the reciprocator. This ability of the actuator to generate forces that track the waveform of the applied current, even when the waveform is of a very irregular shape, is one of the salient features of the present invention.

A sample current waveform, and the forces generated in response thereto by the actuator of the present invention, is shown in FIG. 5. The forces developed assuming a conventional grade of transformer steel is used for the ferromagnetic components, have a frequency response from DC to 100 Hz. If a fine grade of silicon steel is used, the frequency response can be increased to the DC to 400 Hz range. If a frequency response above 400 Hz is desired, ferrites should be used in lieu of steel, in which case the frequency response can reach up to several KHz. However, ferrites tend to saturate at much lower flux densities than do silicon or transformer steels, so the output forces at such high frequencies would be less.

From the above description, it is seen that the relative spacing between the teeth of the reciprocator and the teeth of the stator (i.e., the width of the slots 68 and 64) must be selected in accordance with the desired stroke length of the reciprocator. The exact dimensions are not critical, other than one slot needs to be wider than its facing slot so that the appropriate alignment and misalignment of the teeth occurs as the reciprocator moves between its two extreme positions.

As seen partially in FIGS. 3 and 4, as the pole piece 36 moves between its two extreme positions, the flexures 40 and 42 bend first one way and then the other, maintaining a substantially constant air gap between the pole piece teeth of the reciprocator 36 and the pole piece teeth of the stator 22. This type of flexure mechanism advantageously requires little, if any, maintenance over a very long life. Preferably, the flexure mechanisms 40 and 42 are made from any flexible material, such as a metallic strip of beryllium copper, or a strip of epoxy bonded fiberglass.

It is noted that if the flexure mechanisms 40 and 42 are made from a conductive material, they can also serve the function of providing the electrical connections to the drive coils 64 and 66 on the moving reciprocator 36. Other types of devices for making electrical connections to a moving coil are known in the art, and could also be used. However, use of the flexures 40 and 42 for this purpose advantageously allows these devices to serve two functions—mechanical support and electrical connection—thereby simplifying the design and reducing the cost of the resulting reciprocating electromagnetic actuator.

Referring momentarily to FIGS. 18A-18C, still another manner of making electrical connection with the moving drive coil 64 and 66 is illustrated. In FIG. 18A, a perspective view of a portion of one stator section, i.e., the top section 27 (FIG. 2) is shown, as is a portion of the reciprocator 36.. The flexures 40 and 42 have been omitted from FIG. 18A for clarity. (Further, as is evident from FIGS. 18A-18C, flexures 40 and 42 of the type shown in FIGS. 1 and 2 may not be needed for the configuration shown in FIGS. 18A-18C because the electrical connection means illustrated in FIGS. 18A-18C may also serve the function of providing the needed mechanical support.) Attached to one end of the stator section 27 is L bracket 80. Another L bracket 82 is attached to the reciprocator 36 such that one side of bracket 82 faces one side of bracket 80. A first strip 84 of resilient conductive material, such as copper or beryllium copper, is securely fastened to the facing sides of the two brackets 80 and 82. A second strip 86, also of a resilient conductive material, is also fastened in parallel with the first strip 84. Thus, the strips 84 and 86 form a flexible conductive strip. This strip is bent in a U-shape, and as the reciprocator moves from a first position, FIG. 15B, to a second position, FIG. 15C, the U-shape strips 84 and 86 flex as required in order to maintain the desired electrical contact. A wire 88, or other suitable conductor, connects the back side of bracket 80 to an appropriate current source (see FIG. 8) that generates the drive current. Any suitable means, such as another wire, can be used to electrically connect the strips at the point they contact the bracket 82 to the drive coil (not shown in FIGS. 18A-18C). A similar pair of brackets is used at another location in order to provide electrical contact with the other end of the drive coil.

FIG. 18A further illustrates a variation in the construction of the present invention from that shown in FIGS. 1-4. That is, in FIGS. 1-4, the compensation coil slots 60 and 62 are shown as being narrower than the drive coil slots 68 and 70. However, in FIG. 18A, the compensation coil slot 60' is wider than the drive coil slot 68'. As long as the slot widths are different, and provide flux paths on either side of the slot, a first of which is reduced and a second of which is increased as the moving member of the motor reaches one of its extreme positions, and the second of which is reduced and first of which is increased as the moving member reaches its other extreme position, the actuator of the present invention will operate properly.

Figure 6:
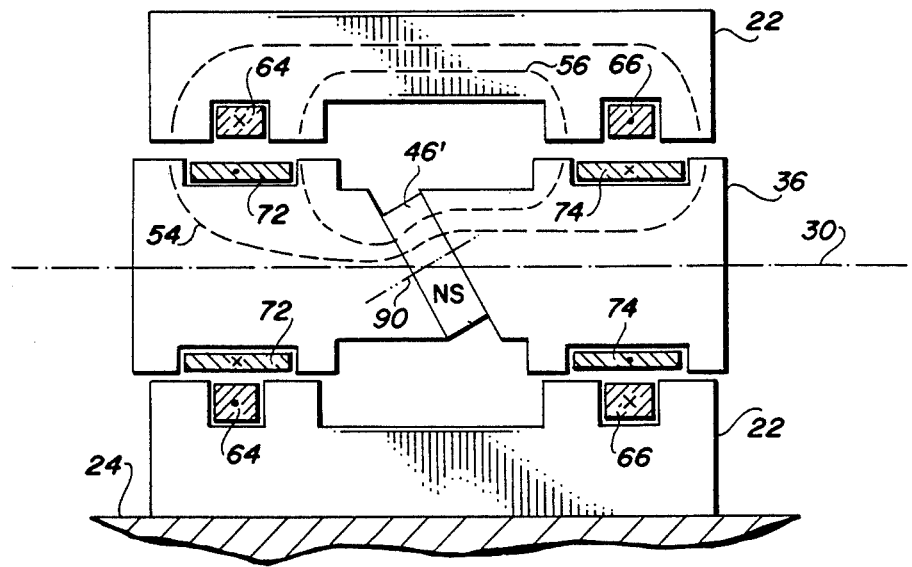
FIG. 6 is a diagrammatic illustration of a skewed-magnet embodiment of the present invention.

Referring next to FIG. 6, a skewed magnet embodiment of the present invention is illustrated. This embodiment is, in most respects, identical to the embodiment shown in FIGS. 1-4. Hence, most of the components and elements share the same reference numerals, and reference should be made to FIGS. 1-4 for a description of these shared components and elements. However, the magnet 46' of the embodiment shown in FIG. 6 has a polar axis 90 that is skewed relative to the longitudinal axis 30 of the actuator. Skewing the magnet in this manner advantageously allows a desired flux density to be maintained through the pole piece while shrinking the width of the pole piece somewhat over what would be required to maintain the same flux density if a skewed magnet of the same strength were not used. For purposes herein, the polar axis is defined as the alignment between the respective poles of the magnet. That is, a line drawn from the center or centroid of the south pole of a magnet to the center or centroid of the north pole of the magnet defines the polar axis.

Figure 7:
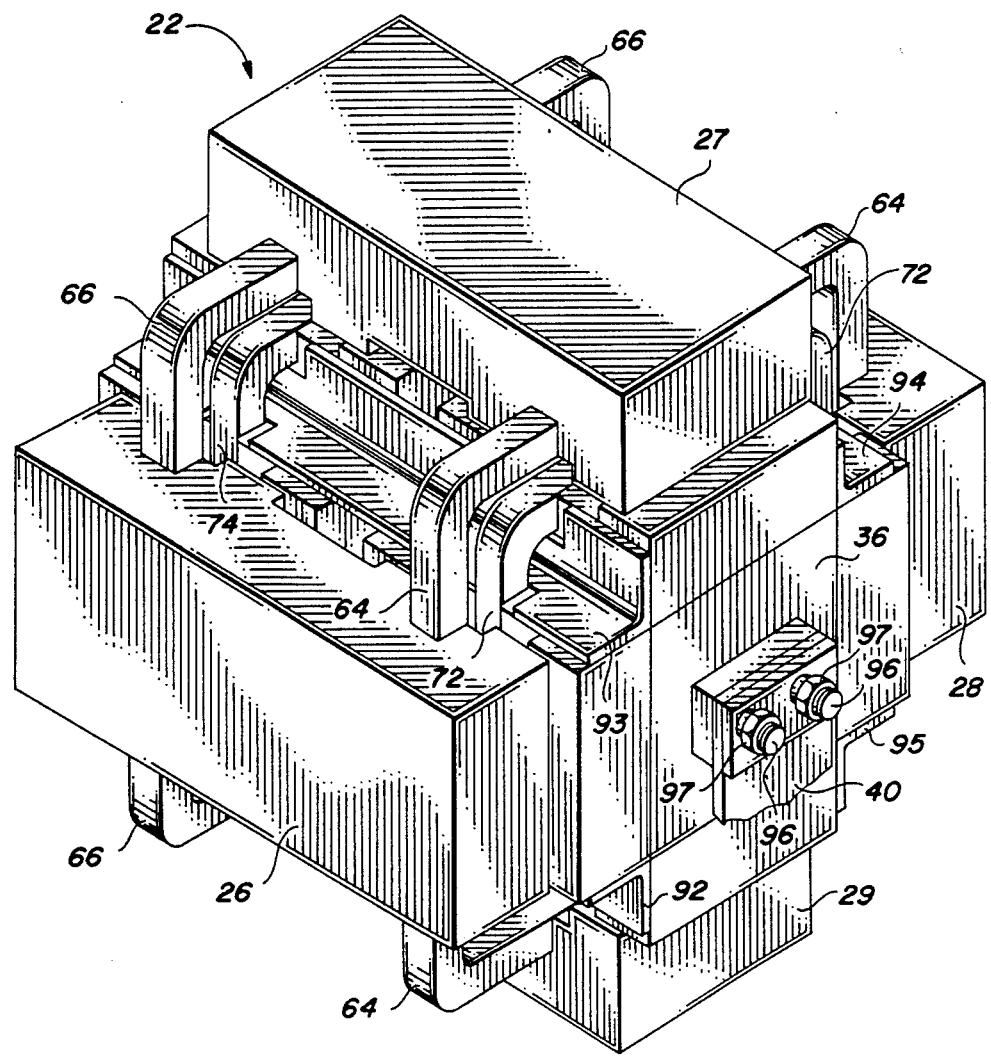
FIG. 7 is a perspective view of a linear reciprocating actuator built in accordance with the teachings of the present invention.

FIG. 7 depicts a perspective view of a reciprocating electric motor fabricated in accordance with the present invention. This view is intended to illustrate the general manner in which most embodiments of a linear reciprocating electromagnetic actuator of the types described herein could be assembled. While each embodiment of the present invention has some differences from the other embodiments, it is noted that many have a stator 22, typically split into four sections 26-29, as previously described in connection with FIGS. 1 and 2. (As will be evident from the description presented below, some embodiments employ a stator that may be made from just two sections rather than four.) Suitable mounting means are used to maintain and support each stator section in a desired spaced-apart relationship relative to the other stator sections. Inside of the stator is a reciprocator 36 supported by flexure mechanisms 40 and 42, one at each end of the actuator. (Only flexure mechanism 40 is visible in FIG. 7, and only a portion of it is shown for clarity.). A compensating coil 64 resides at one end of the actuator, and another compensating coil 66 resides at the other end of the actuator. These coils are embedded in slots within the stator as previously described. These coils are electrically connected in series. Similarly, a drive coil 72 is embedded in a corresponding slot at one end of the reciprocator 36, and another drive coil 74 is embedded in another slot at the other end of the reciprocator. These coils are likewise electrically connected in series, and in series with the compensating coil.

Still referring to FIG. 7, it is noted that the reciprocator 36 may be made from various components, the arrangement of which varies with the particular embodiment being used. Support brackets 92-95 may thus be used in the reciprocator, as required, in order to securely fasten the pole piece elements 48-51 of the reciprocator to its central section 52. Further, fastening means, such as bolts 96 and nuts 97, are used to securely attach the flexures 40 and 42, to the respective ends of the reciprocator.

Referring next to FIG. 8, a block diagram schematically illustrating the various peripheral components that may be used with the embodiments of the present invention is shown. The reciprocating electromagnetic actuator of the present invention is represented as element 20. (This actuator 20 could be any of the embodiments described herein.) The actuator 20 includes a drive coil 65 and a compensation coil 73. Also included is a channel or opening 98 through which a cooling liquid or gas may be passed. Alternatively, cooling jackets, as are known in the art, may be attached around the stator. Peripheral to the actuator 20 is a drive coil control circuit 100 that generates and delivers a desired drive current ID to the drive coil 65. Similarly, a compensating coil control circuit 102 generates and delivers a desired compensating current IC to the compensating coil 73. These circuits 100 and 102 may be of conventional design.

In order for the flux generated by the drive current ID to be offset by the flux generated by the compensating current IC, it is required that the ampere-turns associated with ID and the drive coil 65 be equal and opposite in magnitude to the ampere-turns associated with IC and the compensating coil 73. This criteria is most easily realized by simply making coil 65 and coil 73 of equal turns and connecting the coils in series, thereby forcing the same current to pass through both coils. However, for some applications, it may be desirable to include more or less turns in coil 73 than in coil 65, in which case the magnitude of current IC must be adjusted accordingly in order to achieve the same ampere-turns as are used in coil 65. In such applications, it will still be necessary to control the current IC so as to be synchronized with, even though of an opposite polarity than, the current ID. Thus, in FIG. 8, the compensating coil control circuit 102 is shown as being coupled to the drive current ID, thereby facilitating the needed synchronization.

A cooling system 104 provides the means for delivering a cooling fluid, gas, or other heat transfer agent through the channel or openings 98 of the actuator. It is noted that some low power applications and uses of the actuator described herein may not require any cooling beyond the natural cooling that occurs through exposure of the actuator and portions of the drive and compensating coils to the air. Other applications, however, may require that air be forced through openings in the stator or through gaps between sets of laminations, or that a cooling liquid be pumped through such openings or through a cooling jacket surrounding the actuator. Such cooling systems are well known in the art.

Referring next to FIG. 9, an alternative embodiment of the reciprocating electromagnetic actuator of the present invention is shown. Many of the parts of the actuator of FIG. 9 are the same as for the embodiments previously described (FIGS. 1-4, 6). As with all figures used herein, like parts are identified with like reference numerals throughout. The main difference between the embodiment shown in FIG. 9 and that shown in FIGS. 1-2 is that the magnet 46 of FIG. 1 has been replaced with four magnets 106-109. (Further, assuming the stator 22 is divided into four sections, as suggested by FIGS. 2 and 7, four additional magnets, not shown in FIG. 9, would also be used. However, it is to be emphasized that one possible configuration for the actuator of FIG. 9 uses just two sections for the stator, one on the top and the other on the bottom as drawn in FIG. 9.)

As seen in FIG. 9, the reciprocator 36 includes a center section 52 through which the magnetic flux passes longitudinally. Advantageously, this center section may be of rectangular construction, thereby facilitating its manufacture and allowing it to be readily made from a suitable ferromagnetic material. The magnets 106 and 107 are placed at one end of the reciprocator 36, having their magnetic axes aligned so that the south pole side of the magnet is adjacent the center section 52. Magnets 108 and 109 are placed at the other end of the reciprocator and aligned so that their north pole side is adjacent the center section 52. This alignment of the four magnets causes the magnetic flux to pass longitudinally through the reciprocator 36 from right to left as drawn in FIG. 9. This arrangement also prevents flux from passing transversely through the ends of the pole piece, i.e., from magnet 106 directly to magnet 107, or from magnet 108 directly to magnet 109.

A pole piece 110, having a portion of slot 68 therein (into which a segment of the drive coil 72 is placed), is fastened to the north pole side of magnet 106. Similarly, a pole piece 112, also having a portion of slot 68 therein, is fastened to the north pole side of magnet 107. Pole pieces 114 and 116, each having a portion of slot 70 therein, are likewise fastened to the south pole sides of magnets 108 and 109, respectively, at the other end of the reciprocator 36. These pole pieces 110, 112, 114 and 116 are preferably made from laminations of silicon steel transformer iron.

As thus configured, the actuator of FIG. 9 includes at least two flux paths for each section of the stator. Two such paths 54 and 56 are represented in FIG. 9 by dotted lines having arrowheads thereon indicating the direction of the flux path. As the magnets are positioned and aligned, flux travels clockwise around these paths (from a north pole to a south pole). Operation of the actuator of FIG. 9 is the same as the operation of the actuator described in connection with FIGS. 1-4.

FIG. 10 illustrates a further embodiment of the reciprocating electromagnetic actuator of the present invention. Advantageously, the embodiment shown in FIG. 10 may be "stacked". That is, a first actuator 150 made in accordance with this embodiment may be placed on top of (or next to) a second actuator 152 of the same basic configuration. In turn, a third actuator 154 of essentially the same configuration may be placed under (or next to) the actuator 152. In this manner, the actuators are "stacked" as deep or as high as needed or desired. Mechanical coupling devices (not shown) are then used in conventional manner to couple or tie all of the reciprocators of each actuator together. The drive coils and compensation coils can then be excited at the same time with the same respective drive and compensation currents, resulting in an equivalent reciprocating electromagnetic actuator (made from a plurality of such actuators operating in parallel) having an output force that is essentially the sum of the individual forces developed by each actuator. Such an arrangement advantageously produces a large output force at the reciprocating member.

Of the actuators 150, 152, and 154, the actuator 150 will now be described. Actuators 152 and 154 are essentially identical to actuator 150. The main difference between the actuator 150 and that of the previously described actuators is that the magnetic flux in actuator 150 passes transversely through each end of its reciprocator 36' rather than longitudinally therethrough, as was the case with the prior embodiments (FIGS. 1-4, 6, and 9). This transverse passing of magnetic flux is accomplished by placing a magnet 154 at one end of the reciprocator 36', and by placing an additional magnet 156 at the other end of the reciprocator 36'. Further, the center portion 158 of the pole piece 36' is made from a non-magnetic material. Pole pieces 110 and 112 are placed on each side of the magnet 154 and pole pieces 114 and 116 are placed on each side of the magnet 156, similar to the manner in which these pole pieces are used in the actuator embodiment of FIG. 9. However, the magnetic polarities of magnets 154 and 156 are oriented so as to cause the magnetic flux to flow in the sam direction around the magnetic circuit of the actuator. This magnetic circuit includes an upper stator section 27 and a lower stator section 29 and the pole pieces 110, 112, 114, and 116. As the magnets are oriented in FIG. 10, with the north pole of magnet 154 facing up and the north pole of magnet 156 facing down, the flux path is in a clockwise direction around the magnetic circuit.

It is noted that when a plurality of actuators 150, 152 and 154 are "stacked" as shown in FIG. 10, the air gaps and magnets are effectively in series, with a flux path 164 existing around the entire outside of the "stacked" structure. That is, the flux path 164 represents the path of least magnetic reluctance that the majority of the flux follows. Operation of the "stacked" structure parallels the operation of the single structure previously described.

Another significant difference between the actuator 150 and the previously described embodiments is the orientation of the drive and compensating coils. In FIG. 10, a compensating coil 155 lies in a plane substantially parallel to the longitudinal axis 30 of the motor. That is, as shown in FIG. 10, the compensating coil 155 is essentially embedded (at least partially) in just the upper stator section 27. Similarly, another compensating coil 159 (connected in series with the compensating coil 157) is essentially embedded in just the lower stator section 29. Similarly, drive coils 157 and 161 pass through just the upper pole pieces 110 and 114, or the lower pole pieces 112 and 116, respectively, of the reciprocator 36'. The drive coils thus also lie in planes that are substantially parallel to the plane of the compensating coil.

Referring next to FIG. 11, yet another embodiment of the present invention is illustrated in diagrammatic form. In accordance with this embodiment, the permanent magnets have been moved from the reciprocator to the stator. That is, a magnet 166 is placed at one end of an upper stator section 27'; and another magnet 170 is placed at the other end. Likewise, a magnet 168 is positioned at one end of a lower stator section 29'; and yet another magnet 172 is placed at the other end. The magnetic polarities of these magnets are oriented to cause the magnetic flux path to be in the same direction around the magnetic circuit thus created. (As shown in FIG. 11, this direction is clockwise, because the north pole of magnet 166 is placed against the upper stator section 27', and the south pole side of magnet 170 is also placed against the upper stator section 27'. However, the magnets could just as easily be oriented so that a counter-clockwise flux direction results.) A pole piece 110' is placed against the south pole side of magnet 166. In this pole piece, a slot is made through which compensating coil 155 passes. A similar pole piece 114' is placed against the north pole side of magnet 170. Pole piece 114' likewise has a slot therein through which the compensating coil 155 also passes. Corresponding pole pieces 112' and 116' are used with magnets 168 and 172, each having a slot therein through which a compensating coil 159 passes.

The actuator of FIG. 11 includes a reciprocator 176 that is markedly different than that of prior embodiments. This reciprocator 176 is characterized by its narrow width and low mass, resulting from a construction that includes, from left to right in the figure, a non-magnetic segment 178 (to which the flexure 40 is attached); a first magnetic segment 180; a non-magnetic segment 182 (through which a drive coil 184 passes); a second magnetic segment 186; a non-magnetic center section 158; a third magnetic segment 188; a non-magnetic segment 190 (through which the drive coil 184 passes); a fourth magnetic segment 192; and a non-magnetic segment 194 (to which the flexure 42 is attached).

In operation, the actuator of FIG. 11 functions the same as the embodiments previously described with the exception that the magnetic segments 180 and 186 function as the equivalent of the teeth 23C and 23D of the pole piece previously described in connection with FIGS. 3 and 4. Similarly, the magnetic segments 188 and 192 function as the equivalent of the teeth 25C and 25D of the pole piece described in connection with FIGS. 3 and 4. Further, only a single drive coil 184 is used. One coil is sufficient in this instance because of the proximity of the single compensating coil to both drive coils. This single coil has the same ampere-turns as the sum of the ampere-turns of coils 155 and 159.

A variation of the embodiment shown in FIG. 11 is illustrated in FIG. 12. FIG. 12 only shows the left-hand portion of the actuator, but this is sufficient to illustrate the differences between the embodiment of FIG. 11 and that of FIG. 12. Essentially, the stator of the actuator of FIG. 12 is identical to that of FIG. 11. However, the actuator of FIG. 12 includes a different reciprocator 196 that includes a magnetic pole piece 198 having slots 200 and 202 therein through which respective drive coils 157 and 161 pass. A center section (not shown) of the reciprocator 196 is non-magnetic, as with the embodiment of FIG. 11.

Figure 13A:
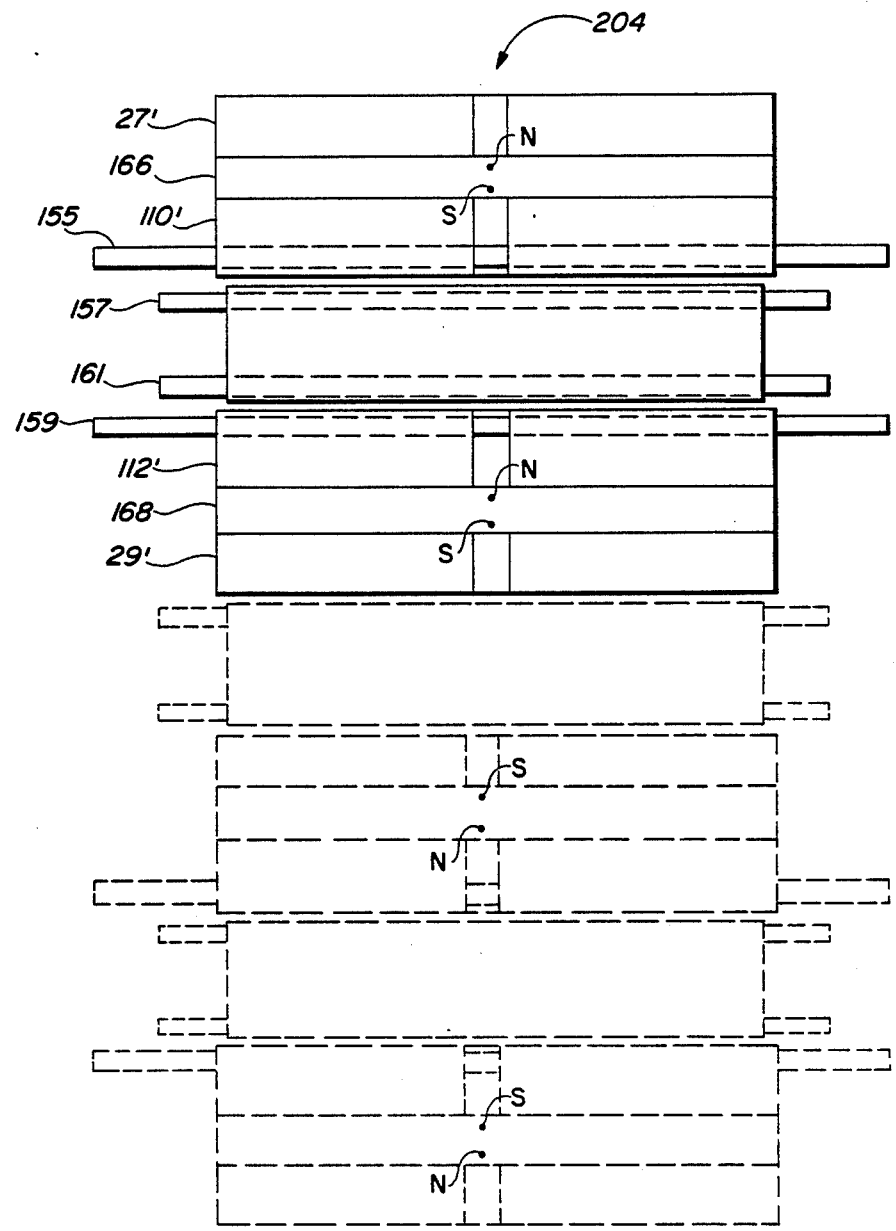
FIG. 13A is an end view of the embodiment of FIG. 12, and also illustrates how this embodiment (as well as the embodiment of FIG. 11) can be selectively stacked.

FIG. 13 illustrates an end view of the actuator of FIG. 12 and further shows in diagrammatic form how a plurality of such actuators could be stacked. Stacking may be advantageous for some applications as described above in connection with FIG. 10. It is to be understood that this concept of "stacking" also applies to the embodiment shown in FIG. 11; however, the particular actuators stacked in FIG. 13 are those of FIG. 12 as evidenced by the dual drive coils 157 and 161 that are visible. The end view of FIG. 13A further illustrates a cooling slot 204 through which a suitable cooling fluid or gas could be circulated in the various sections of the core piece.

Referring next to FIG. 13B, a top view of the motor of FIG. 12 is shown. In addition to the cooling slot 204 visible in the end view of FIG. 13A, additional cooling slots 206 and 208 are illustrated. Other arrangements of cooling slots or channels could, of course, be used.

Figure 14:
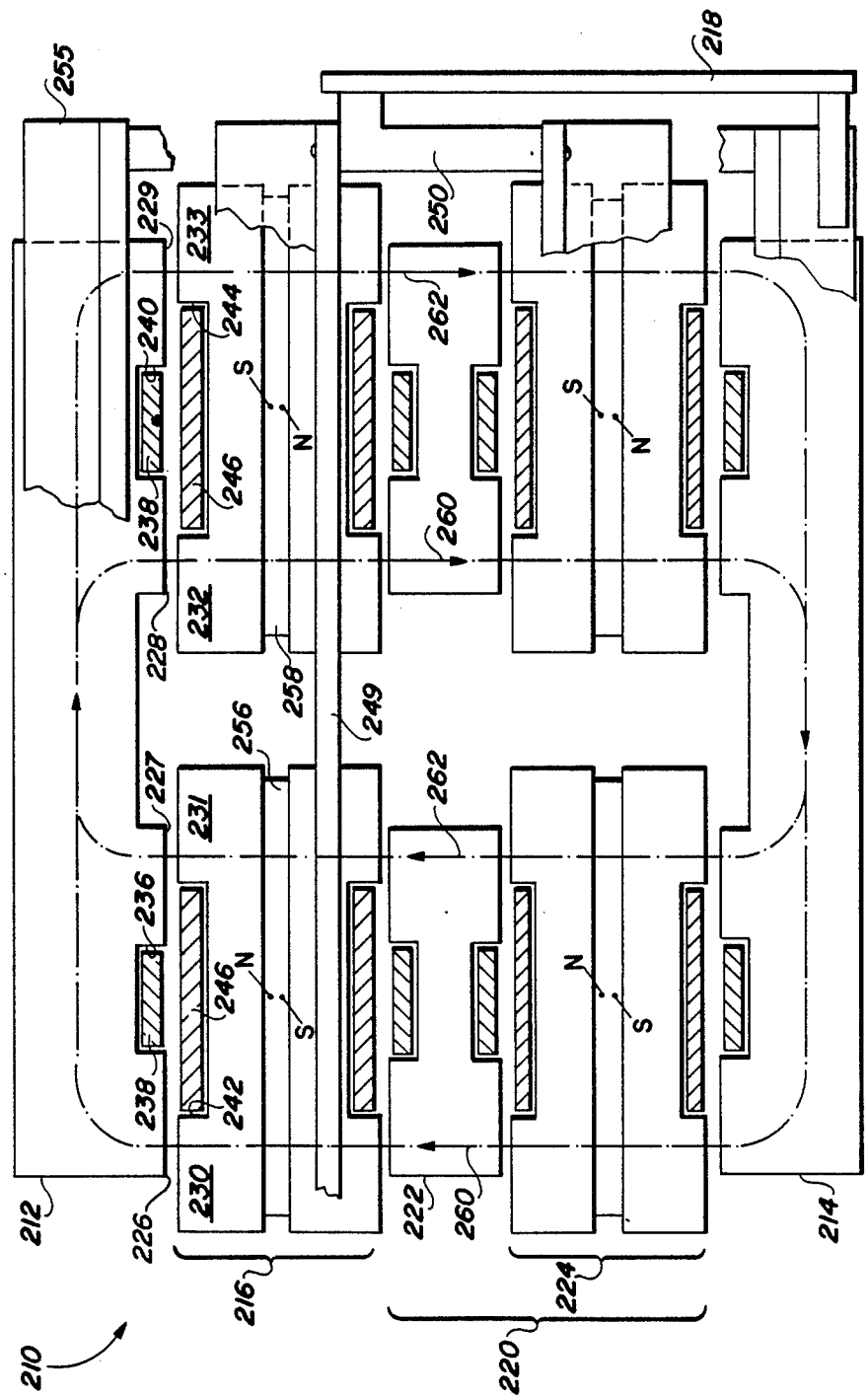
FIG. 14 is a diagrammatic representation of yet another embodiment of the invention.

Referring next to FIGS. 14 and 15, a preferred embodiment of an actuator 210 according to the present invention is illustrated in diagrammatic form. These figures further show a preferred technique for stacking several actuators. The embodiment shown in FIGS. 14 and 15, includes an upper stator section 212 and a lower stator section 214. A reciprocator 216 is mounted for reciprocal motion next to the upper stator section 212 using a flexure 218 at each end of the actuator 210. (For clarity, only one flexure is shown in FIGS. 14 and 15.) If stacking is desired, an actuator stacking module 220 may optionally be inserted intermediate the reciprocator 216 and the lower stator section 214. While only one such stacking module 220 is illustrated in FIGS. 14 and 15, it is to be understood that any number of such stacking modules could be inserted within the actuator 210. The stacking module 220 includes an intermediate stator section 222 and an additional reciprocator 224.

The upper stator section 212 includes pole pieces 226, 227, 228 and 229 that interface with corresponding pole pieces 230, 231, 232, and 233, respectively, on the ends of the reciprocator 216. The space between pole pieces 226 and 227 of the upper stator section 212 defines a slot 236 through which a portion of a compensating coil 238 passes. Similarly, the space between pole pieces 228 and 229 defines a slot 240 through which another portion of compensating coil 238 passes. Likewise, the space between pole pieces 230 and 231 of the reciprocator 216 defines a slot 242; and the space between pole pieces 232 and 233 defines a slot 244. Portions of a drive coil 246 pass through the slots 242 and 244.

In a similar manner, other pole pieces of the lower stator section 214 interface with pole pieces of the intermediate reciprocator 224; and still additional pole pieces on both sides of the intermediate stator 222 interface with corresponding pole pieces on the lower side of reciprocator 216 and the upper side of reciprocator 224. These pole pieces define additional slots into which additional coils, not shown, are placed in the same manner as are coils 238 and 246. In this respect, it is noted that reciprocator 224, included within the stacking module 220, is identical in all respects to the reciprocator 216. The intermediate stator section 222, while not identical to either the upper stator section 212 or the lower stator section 214, is similar in that it has pole pieces fronting on both sides thereof, rather than on a single side as is the case with the upper and lower pole pieces 212 and 214. However, the spacing between the pole pieces of the intermediate stator 222, and hence the width of the slots through which the coils pass, is in all respects identical to that of the stator section 212 and the pole pieces 226-229.

As seen in FIGS. 14 and 15, the two reciprocators 216 and 224 each include two identical end sections tied together with "L" trusses 249. Each end section includes a permanent magnet 256 or 258 having upper and lower pole sections on each side thereof. The pole pieces 230 and 231 form part of the upper pole section above magnet 256, and the pole pieces 232 and 233 form part of the upper pole section placed above magnet 258.

As is evident from FIG. 14, flexure 218 is attached to both reciprocators 216 and 224. The preferred manner of attachment is to mechanically tie the ends of the reciprocators 216 and 224 together with a tie bar 250, and to mechanically fasten the tie bar 250 to the flexure 218 at a single point 252 near its free end. One leg of the "L" truss 249, which is securely fastened to all components at the end of each reciprocator 216 and 224, provides the means for attaching the reciprocators to the tie bar 250. Note that as shown best in FIG. 15, the "L" truss fastened to the lower reciprocator 224 is oriented so as to be up-side-down relative to the "L" truss fastened to the upper reciprocator 216. The other end of the flexure 218 is securely fastened to suitable support structure 254, portions of which are visible in FIGS. 14 and 15. This support structure includes "L" trusses 255 positioned along the length of the each stator section 212, 214, and 222, tied together with the support structure 254. The support structure 254, 255 is firmly anchored to prevent undesirable movement.

As indicated above, the embodiment shown in FIGS. 14 and 15 includes a permanent magnet 256 located at one end of the reciprocator 216, and another permanent magnet 258 located at the other end of the reciprocator. Like magnets are placed in both ends of reciprocator 224. The polarity of these magnets is oriented such that a clockwise flux path is set up around the stacked structure. In particular, with the reciprocators 216 and 224 positioned as shown, intermediate their extreme left and right positions, two main flux paths 260 and 262 are present, illustrated in FIG. 14 as dashed-dotted lines, with the flux path 260 passing through the pole pieces on the left side of the various slots, and the flux path 262 passing on the right of the various slots.

Operation of the actuator 210 of FIGS. 14 and 15 is the same as operation of the other embodiments previously described. That is, coils 238 and 246 are connected in series, as are all the coils in the actuator, so that the stator coils have an equal but opposite ampere-turns from the reciprocator coils. The constant magnetic flux density found at each air gap interacts with the current in the coils so as to move the reciprocators in one direction or the other along its longitudinal axis as a function of the polarity of the current. The magnitude of the force with which the reciprocators move is linearly proportional to the magnitude of the current over the full stroke distance of the reciprocators, as has been previously described.

The flexure 218 is preferably constructed at its flexing end with a strip of BeCu surrounded by strips or layers of epoxy-fiberglass. The lower or anchored portion of the flexure 40 is made from epoxy-fiberglass. The stator sections 212, 214 and 222, including the various pole pieces associated with each stator section, are preferably constructed of silicon steel laminations. Similarly, the end sections of the reciprocators, above and below the magnets, are also preferably made from silicon steel laminations. The "L" trusses 249 and 255, and other support structure, are preferably made from stainless steel; but any material suitable for providing the support function could be used. Electrical connections with the reciprocator coils are made with flexure mechanisms like those shown in FIGS. 18A-18C, or with conventional sliding brushes. The magnets 250 and 258, and other magnets used within the reciprocator 224 may be any suitable permanent magnet, preferably rare earth, high flux density magnets, such as samarium cobalt magnets, available from numerous commercial sources, e.g., General Electric Corp, Permag Corp. Bunting Magnetics Co., and other magnet vendors.

FIG. 16 diagrammatically illustrates a water-cooled version of the actuator embodiment of the invention shown in FIGS. 14 and 15. Only a portion of the lower stator 214 and the reciprocator 224 are shown in FIG. 16, but other portions of the actuator are the same, so that which is shown in FIG. 16 suffices to teach how water-cooling of both the stator and reciprocator is accomplished. Essentially, channels or openings 260 are placed in the stator section 214 so as to allow water, or another suitable cooling liquid, to flow therethrough. Such liquid may simply flow through these channels under the force of gravity, or the fluid may be pumped.

Similarly, channels or openings 262 are positioned within the end sections of the reciprocator 224, as well as the other reciprocator sections of each reciprocator. A preferred manner in which water (or other suitable fluid) is delivered to these channels or openings 262 is illustrated in FIG. 17. As shown in FIG. 17, a trough 264 is placed at a suitable location on the reciprocator. An inlet tube 266, anchored to the support structure 254 (i.e., not moving) brings fluid to the trough 264. Regardless of the position of the trough on the moving reciprocator 224, the dimensions of the trough are such that the liquid flowing through the inlet tube 266 will fall in the trough. The trough 264 includes slosh baffles 268 along the bottom thereof to keep the water or other fluid from excessive sloshing as the reciprocator moves. An outlet tube or channel 270, located in the bottom of the trough 264, carries the fluid to the channels 262. After passing through the channels 262, the liquid is allowed to fall in a similar trough, not shown, that is stationary. Here, the fluid is cooled in conventional manner, and then re-pumped back to the inlet tube 266.

The manner of transferring water to the moving reciprocator shown in FIG. 17, or an equivalent technique, could also be used to electrically connect the coils on the moving reciprocator to a stationary source of current, thereby creating a "liquid slip ring." That is, by filling the trough 264 with a conductive fluid, and by constructing the trough with a suitable electrical insulating material (or by electrically insulating a trough made from a conductive material), a pair of electrodes could be inserted into the trough. One of these electrodes would be stationary, similar to the inlet tube 266. (In fact, the inlet tube 266 could serve the function of this electrode if made from a conductive material.) The other electrode would be mounted to the trough, and would thereby move with the trough, and would be electrically connected to the moving coil on the reciprocator. A separate trough, having a separate pair of electrodes, would be used to provide the electrical return path from the coil.

Next, referring to FIG. 19, a rotary or angular embodiment of the present invention is shown. This embodiment includes the same basic elements as does the previously described linear embodiments: a stationary stator 120 and a movable reciprocator 122. The stator 120 is circular in shape, having a center aligned with rotational axis 124 (which axis appears as an "x" in FIG. 16 because it extends into and out of the plane of the paper). The reciprocator 122 is mounted for rotation about the rotational axis 124. A shaft 126 is also attached to and aligned with this axis. The reciprocator includes a bar-type permanent magnet 130 having a longitudinal and flux axis 132 that is perpendicular to the rotational axis 124. A pole piece 128 is attached to each end of the magnet 130. This pole piece is configured to define a constant length air gap W4 between it and the inside circumference of the circular stator 120. A slot 134 is placed within opposite sides of the stator 120, and a compensating coil 136 passes through this slot so as to be in good thermal contact therewith. Another slot 135 is placed in the pole piece 128 so as to face the slot 134. A drive coil 137 passes through this slot 134 in conventional manner. As with the linear embodiments previously described, the thickness of the coil 136 is less than the depth of the slot 134, thereby allowing the air gap W4 to be as small as mechanical tolerances will allow Rotational movement of the reciprocator 122 is limited to only a few degrees, generally only that portion of rotation where at least a portion of the end face of the pole piece 128 is fronting the coil 136.

Operation of the rotational embodiment shown in FIG. 19 parallels that of the linear embodiments previously described. Essentially, the reciprocator 122 as shown in FIG. 19 is in its extreme counter-clockwise position. In this position, a single flux path exists that crosses the air gap W4 at a location generally coincident with the dimensional markings of the gap W4. When a current is introduced into the coil 135, it interacts with the magnetic flux density in the air gap W4 to cause the reciprocator 122 to start rotating clockwise. As it rotates, two flux paths are created, one passing on each side of the slot. However, the combined areas through which the flux passes, and hence the magnetic flux density, remains substantially constant, whereby the magnitude of the force generated also remains substantially constant for a given value of current in the coil 135. As the reciprocator continues to move, it reaches an extreme clockwise position where all of the flux crosses on the other side of the slot 134 than is shown in FIG. 9. At this position, the magnetic flux density, and hence the force, still remains substantially constant. By applying a current to the coil 135 (of a desired waveform shape), forces can thus be generated that are linearly proportional to the current regardless of the position of the reciprocator between its extreme positions. These forces can be coupled with the shaft 124 to any desired load.

As is evident from the above description, there are several advantages provided by the reciprocating electromagnetic actuator of the present invention. First, the coils are in intimate thermal contact with the stator, or reciprocator, which elements act as a heat sink and heat conductor to the environment. For some applications, as has been indicated, it is possible to liquid cool the actuator and/or coils with a liquid jacket of tubing affixed to the stator. Second, the coils can have a large cross section of copper having a relatively low resistance. This further increases the allowable current that can flow in the coil and increases the forces that can be developed. Third, the use of a compensation coil offsets the magnetic flux generated by the drive current, thereby reducing the self inductance of the drive coil to zero and assuring a constant magnetic flux density across the air gap, independent of the position of the reciprocator along its stroke length. Fourth, and most significantly, the constant magnetic flux density allows an output force to be generated that is linearly proportional to the drive current, along the entire length of the reciprocator's stroke. Fifth, the size and weight of the moving magnet and reciprocators are minimized because the magnetic flux remains in paths having low reluctance, except for very short air gaps. Thus, the shortness of the air gaps are not limited by the coil thickness and there is no need for a large magnet to generate the requisite flux densities because sufficient flux densities can be realized using smaller magnets and shorter air gaps. All of these advantages combine to provide a linear reciprocating electromagnetic actuator that can linearly generate high forces, over a wide frequency response, yet that has dimensions, weight, cost and power dissipation much less than prior art devices designed to generate forces of the same magnitude.

While the invention described herein has been described with reference to particular embodiments and applications thereof, numerous variations and modifications could be made thereto by those skilled in the art without departing from the spirit and scope of the invention as claimed. Accordingly, the true scope of the invention should be determined with reference to the claims set forth below.

What is claimed is:

1. A reciprocating electromagnetic actuator comprising:
   a reciprocator formed of ferromagnetic material having a longitudinal axis; a stator having a longitudinal axis and mounted parallel relative to the axis of said reciprocator, said stator being formed of ferromagnetic material, said stator having a first surface facing said reciprocator, said stator further having a first slot of a first width therein opening to said first surface;
   a first coil having at least a portion thereof disposed in said first slot;
   said reciprocator having a second surface facing said first surface at a fixed distance therefrom, said fixed distance being defined as an air gap, said second surface having a second slot therein facing said first slot, said second slot having a second width, said second width being different than said first width, at least one overlap area being defined on each side of said first or second slot where said first and second surfaces directly front each other separated by said fixed air gap, said overlap areas being so disposed that motion of the reciprocator equally increases one overlap area and decreases another overlap area, whereby the total overlap area remains constant;

a second coil having at least a portion thereof disposed in said second slot;

means for generating a constant magnetic flux that passes through said reciprocator and said stator following a flux path that passes across said air gap through said overlap areas, bypassing said first and second slots on at least one side of said slots, said magnetic flux linking said first and second coils or not linking said first and second coils as a function of whether the magnetic flux bypasses said first and second slots on one side or the other; and means for exciting said first coil with a first current for producing a first ampere-turns, and for exciting said second coil with a second current for producing a second ampere-turns, said first and second ampere-turns being equal in magnitude and opposite in polarity at all times, whereby any magnetic flux generated by said first ampere-turns is offset by an opposing magnetic flux generated by said second ampere-turns, and further whereby the total magnetic flux passing through said air gap remains constant regardless of the position of the reciprocator relative to the stator;

whereby a force is produced between said stator and said reciprocator that is proportional to magnitude of the current in said second coil.

2. The reciprocating electromagnetic actuator of claim 1 wherein said magnetic flux generating means comprises at least one permanent magnet mounted within said reciprocator.

3. The reciprocating electromagnetic actuator of claim 2 wherein said at least one permanent magnet is positioned within said reciprocator so as to cause the magnetic flux to pass longitudinally therethrough.

4. The reciprocating electromagnetic actuator of claim 3 wherein said first coil lies substantially in a plane that is perpendicular to the longitudinal axis of said reciprocator and said stator.

5. The reciprocating electromagnetic actuator of claim 2 wherein said at least one permanent magnet is positioned within said reciprocator so as to cause the magnetic flux to pass transversely therethrough.

6. The reciprocating electromagnetic actuator of claim 5 wherein said reciprocator includes a non-magnetic material near the center thereof.

7. The reciprocating electromagnetic actuator of claim 2 wherein said at least one permanent magnet has a polarity axis running from its north pole to its south pole that is skewed relative to the longitudinal axis of said reciprocator.

8. The reciprocating electromagnetic actuator of claim 1 wherein said first coil lies substantially in first plane that is parallel to the longitudinal axis of said reciprocator and said stator.

9. The reciprocating electromagnetic actuator of claim 8 wherein said second coil lies substantially in a second plane that is parallel to said first plane.

10. The reciprocating electromagnetic actuator of claim 1 wherein said magnetic flux generating means comprises at least one permanent magnet mounted within said stator.

11. The reciprocating electromagnetic actuator of claim 10 wherein said at least one permanent magnet is positioned within said stator so as to cause the magnetic flux to pass transversely through said reciprocator.

12. The reciprocating electromagnetic actuator of claim 11 wherein said reciprocator further includes a non-magnetic material disposed near the center thereof.

13. The reciprocating electromagnetic actuator of claim 11 wherein said first coil lies substantially in a first plane that is substantially parallel to the longitudinal axis of said stator.

14. The reciprocating electromagnetic actuator of claim 13 wherein said second coil lies substantially in a second plane that is substantially parallel to said first plane.

15. The reciprocating electromagnetic actuator of claim 1 wherein said magnetic flux generating means comprises four permanent magnets, each of a first pair of said magnets being disposed on opposite sides of a first end of said stator, and each of a second pair of said magnets being disposed on opposite sides of a second end of said stator, said magnets each having a magnetic polarity that causes magnetic flux to flow in said flux path in the same direction.

16. The reciprocating electromagnetic actuator of claim 1 further including means for cooling said stator and said reciprocator, whereby heat present in said stator and reciprocator can be dissipated.

17. The reciprocating electromagnetic actuator of claim 1 further including means for holding said stator stationary and for allowing said reciprocator to axially move back and forth within said stator.

18. The reciprocating electromagnetic actuator of claim 17 wherein said means for exciting said second coil with said second current includes:

a current source that generates said second current; and conductive flexure means for electrically and continuously connecting said current source to said second coil regardless of the reciprocating motion of said coil as said coil moves within said reciprocator.

19. The reciprocating electromagnetic actuator of claim 18 wherein said conductive flexure means is further for mechanically supporting said reciprocator for reciprocating axial motion within said stator.

20. The reciprocating electromagnetic actuator of claim 1 wherein said first and second coils are connected in series, whereby said first current equals said second current.

21. A reciprocating electromagnetic actuator assembly comprising:

a plurality of actuator units physically stacked together, each of said units including:

a reciprocator formed of a material allowing magnetic flux to pass therethrough and having a longitudinal axis, a stator having a longitudinal axis and mounted concentrically relative to said reciprocator, said stator being formed of a material allowing magnetic flux to pass therethrough, said stator having a surface facing said reciprocator, said stator further having a first slot of a first width therein opening to said surface, a drive coil having at least a portion thereof disposed in said first slot, said reciprocator having a second slot therein facing said first slot, said second slot having a second width, said second width being different than said first width, a compensating coil having at least a portion thereof disposed in said second slot, means for generating a magnetic flux that passes through said reciprocator and said stator following a flux path that bypasses said first and second slots on at least one side of said slots, said magnetic flux linking said drive coil or not linking said drive coil as a function of whether the magnetic flux bypasses said first slot on one side or the other, and means for exciting said drive coil with a drive current and for exciting said compensating coil with a compensating current, said drive current and compensating current having respective polarities such that forces generated by the interaction of the magnetic flux linking said excited drive coil and excited compensation coil cause relative reciprocating axial motion at prescribed force levels between said stator and said reciprocator;

means for exciting the drive coils and compensating coils of each of said units with a desired drive current and compensating current at the same time; and p2 means for physically coupling the relative motion between the stators and reciprocators of all of said units in a way that adds the forces causing said motion together;

whereby the force generated by the reciprocating electromagnetic actuator assembly is substantially equal to the sum of the individual forces generated by each unit within said assembly.

22. A reciprocating electromagnetic actuator comprising:

a stator having spaced pole end pieces extending therefrom, each of said pole pieces including at least one slot;

a reciprocator assembly having spaced-apart magnetic portions supported for reciprocation adjacent said pole pieces, each of said magnetic portions having at least one slot facing a respective one of said pole pieces;

means for establishing a magnetic circuit through said pole pieces and through said reciprocator magnetic portions, said magnetic circuit having a magnetic flux of substantially constant magnitude;

a compensating coil positioned at least in part within the slots of said pole pieces;

a drive coil positioned at least in part within the slots of the magnetic portions of said reciprocator assembly;

means for exciting said drive coil with a drive current, thereby producing a drive coil ampere-turns;, and means for exciting said compensation coil with a compensation current, thereby producing a compensation coil ampere-turns;

said drive ampere-turns and said compensation ampere-turns being of equal magnitude and opposite polarity at all times.

23. The reciprocating electromagnetic actuator of claim 22 wherein said means for exciting said drive coil includes:

current generating means for generating said drive current; and conductive flexure means for electrically coupling said drive coil to said current generating means and for supporting said reciprocator assembly, including said drive coil, for reciprocation within said stator.

24. The reciprocating electromagnetic actuator of claim 22 wherein said means for establishing said magnetic circuit includes at least one permanent magnet mounted within said stator.

25. The reciprocating electromagnetic actuator of claim 24 wherein said means for establishing said magnetic circuit includes at least one permanent magnet mounted near each pole piece of said stator.

26. The reciprocating electromagnetic actuator of claim 25 further including means for cooling said actuator.

27. The reciprocating electromagnetic actuator of claim 26 wherein said cooling means comprises means for passing a heat transfer agent, such as a liquid, through portions of said stator and said reciprocator.

28. The reciprocating electromagnetic actuator of claim 22 wherein said means for establishing said magnetic circuit includes at least one permanent magnet mounted within each of the magnetic portions of said reciprocator assembly.

29. An reciprocating electromagnetic actuator comprising:

a stator assembly having spaced pole pieces extending therefrom, each of said pole pieces including at least one slot;

a reciprocator assembly supported for oscillation adjacent said pole pieces;

means for establishing a magnetic circuit loop through said stator assembly and through said reciprocator assembly, said magnetic circuit loop having a magnetic flux of substantially constant magnitude flowing therethrough;

a compensating coil positioned at least in part within the slots of said pole pieces;

a drive coil facing said compensating coil and embedded within said reciprocator assembly; and means for exciting said drive coil with a drive current and said compensation coil with a compensation current so as to produce substantially equal ampere-turns in each coil at substantially the sam time.

30. The reciprocating electromagnetic actuator of claim 29 wherein said means for establishing a magnetic circuit loop includes at least one permanent magnet mounted within said armature assembly.

31. The reciprocating electromagnetic actuator of claim 30 wherein said permanent magnet has a magnetic axis that is skewed relative to the longitudinal axis of said armature assembly.

32. A reciprocating electromagnetic actuator comprising:

a stator;

a reciprocator;

at least one air gap between said stator and said reciprocator;

at least one source of magnetic flux;

at least one drive coil;

at least one compensating coil;

a drive electric current through said drive coil producing drive ampere-turns;

a compensating electric current through said compensating coil producing compensating ampere-turns; and support structure for supporting said stator and said reciprocator with said air gap therebetween, said support structure including means for allowing said reciprocator to move relative to said stator in a direction parallel to said air gap;

said stator and said reciprocator having ferromagnetic portions;

said ferromagnetic portions, said source of magnetic flux, and said air gap comprising a magnetic circuit;

said air gap being divided into two parallel portions separated by slots in said stator and said reciprocator, one of said stator or reciprocator parallel portions overlapping the other of said stator or reciprocator parallel portions with two overlap areas so disposed that motion of the reciprocator equally increases one overlap area and decreases the other overlap area;

said drive coil and said compensating coil being disposed in said slots;

said compensating ampere-turns being substantially equal to and of an opposite polarity from said drive ampere-turns at all times;

whereby the magnetic flux density is said air gap is substantially constant regardless of reciprocator position or of current magnitudes; and whereby a force is produced between said stator and said reciprocator proportional to said current and independent of the reciprocator position.

33. A reciprocating electromagnetic actuator comprising:

a reciprocator formed of a ferromagnetic material;

a stator also formed of a ferromagnetic material, the reciprocator being mounted for reciprocal motion relative to the stator;

means for generating a constant magnetic flux that passes through the stator and reciprocator;

a first coil disposed in the reciprocator through which a first current is passed, said first current creating a first magnetic flux that subtracts or adds to said constant magnetic flux; and a second coil disposed in the stator through which a second current is passed, said second current creating a second magnetic flux that offsets the first magnetic flux, whereby the total magnetic flux passing through the stator and reciprocator remains constant.

34. The reciprocating electromagnetic actuator of claim 33 wherein the reciprocator and stator are mounted such that their respective longitudinal axes are parallel to each other, concentrically, so as to allow relative linear motion between the reciprocator and the stator.

35. The reciprocating electromagnetic actuator of claim 33 wherein the reciprocator and stator are mounted such that their respective axes of rotation are concentric, thereby allowing relative angular motion between the reciprocator and the stator.

36. The reciprocating electromagnetic actuator of claim 33 wherein the stator has a first pole piece in which a first slot of a first width is placed, the first coil passing through this first slot; and wherein the reciprocator has a second pole piece in which a second slot is placed, the second slot generally facing the first slot, the second slot having a second width different than the first width, the second coil passing through the second slot; and wherein the magnetic flux passes through the reciprocator and stator following a flux path that bypasses the first and second slots on at least one side of the slots, the magnetic flux thereby linking or not linking the first and second coils as a function of whether the magnetic flux bypasses the slots on one side or the other.

37. The reciprocating electromagnetic actuator of claim 36 further including means for exciting the first coil with said first current and for exciting the second coil with said second current, said second current and second coil being of equal ampere turns to said first current and first coil.

* * * * *

UNITED STATES PATENT AND TRADEMARK OFFICE
CERTIFICATE OF CORRECTION

PATENT NO. : 4,945,269　　　　　　　　　　　　　　　　　Page 1 of 2

DATED : July 31, 1990

INVENTOR(S) : Kamm

It is certified that error appears in the above-identified patent and that said Letters Patent is hereby corrected as shown below:

On the title page, under References cited, add the following U.S. Patent Documents:

```
    3,119,940    1/1964    Pettit et al......310/15
    3,336,488    8/1967    Scott.............310/15
    3,366,809    1/1968    Scott.............310/15
    3,433,983    3/1969    Keistman et al....310/15
    3,484,629   12/1969    Kunz..............310/15
    3,518,463    6/1970    Abbott............310/15
    3,536,941   10/1970    Fourtellotte......310/27
    4,206,373    6/1980    Hurst.............310/13
```

UNITED STATES PATENT AND TRADEMARK OFFICE
CERTIFICATE OF CORRECTION

PATENT NO. : 4,945,269

DATED : July 31, 1990

INVENTOR(S) : Kamm

It is certified that error appears in the above-identified patent and that said Letters Patent is hereby corrected as shown below:

Column 6, line 54, change "pas" to --pass--.

Column 8, line 17, change "51-" to --51'--.

Column 14, line 54, change "sam to --same--.

Column 20, line 48, begin a new paragraph with "a stator".

Column 23, line 21, delete "p$^2$" and begin a new paragraph with "means for".

Column 24, line 39, change "sam" to --same--.

Signed and Sealed this

Third Day of December, 1991

Attest:

HARRY F. MANBECK, JR.

Attesting Officer

Commissioner of Patents and Trademarks